United States Patent
Pohl et al.

(10) Patent No.: US 12,152,665 B2
(45) Date of Patent: Nov. 26, 2024

(54) HARDENED SLOT WALLS IN A SKEW SHIFTING CONTINUOUS VARIABLE PLANETARY SYSTEM

(71) Applicant: enviolo B.V., Amsterdam (NL)

(72) Inventors: Brad Pohl, Leander, TX (US); Siddhesh Ozarkar, Leander, TX (US)

(73) Assignee: enviolo B.V., Amsterdam (NL)

( * ) Notice: Subject to any disclaimer, the term of this patent is extended or adjusted under 35 U.S.C. 154(b) by 0 days.

(21) Appl. No.: 18/220,191

(22) Filed: Jul. 10, 2023

(65) Prior Publication Data
US 2024/0011554 A1  Jan. 11, 2024

Related U.S. Application Data

(60) Provisional application No. 63/359,524, filed on Jul. 8, 2022.

(51) Int. Cl.
*F16H 57/08* (2006.01)
*F16H 15/50* (2006.01)

(52) U.S. Cl.
CPC .......... *F16H 57/082* (2013.01); *F16H 15/503* (2013.01)

(58) Field of Classification Search
CPC ............................ F16H 15/503; F16H 57/082
See application file for complete search history.

(56) References Cited

U.S. PATENT DOCUMENTS

| | | | |
|---|---|---|---|
| 11,174,922 B2 * | 11/2021 | Nichols | F16H 15/28 |
| 2010/0173743 A1 * | 7/2010 | Nichols | F16H 15/52 |
| | | | 476/67 |
| 2010/0267510 A1 * | 10/2010 | Nichols | F16H 15/503 |
| | | | 475/331 |
| 2015/0111685 A1 * | 4/2015 | Biermann | F16H 48/10 |
| | | | 475/248 |
| 2016/0245390 A1 * | 8/2016 | Mitsch | F03D 80/70 |
| 2016/0273626 A1 | 9/2016 | Raszkowski | |
| 2017/0089433 A1 * | 3/2017 | Stevenson | F16H 57/0487 |
| 2017/0268638 A1 * | 9/2017 | Nichols | F16H 61/664 |

FOREIGN PATENT DOCUMENTS

| | | |
|---|---|---|
| EP | 3270006 | 1/2018 |
| EP | 3425242 A1 | 1/2019 |
| JP | 2002250421 A | 9/2002 |

* cited by examiner

*Primary Examiner* — Edwin A Young

(74) *Attorney, Agent, or Firm* — Sheppard, Mullin, Richter & Hampton LLP

(57) ABSTRACT

A continuous variable planetary (CVP) system comprises a C2 carrier having a pattern of slots, the slots having one or more slot walls; a C1 carrier, at least one of the C2 carrier or C1 carrier being rotatable relative to the other; at least three planetary assemblies coupled between the C2 carrier and the C1 carrier, each planetary assembly including a planet, a planet axle, and an end cap on at least one end of the planet axle, the end cap disposed within the slot, rotation of C2 carrier relative to the C1 carrier inducing a skew condition in the planet axle and thereby inducing a tilt condition on the planet axle; and a protective layer affixed against at least one of the one or more slot walls, the protective layer including one or more protective layer attachment features configured to attach to one or more slot wall attachment features.

22 Claims, 25 Drawing Sheets

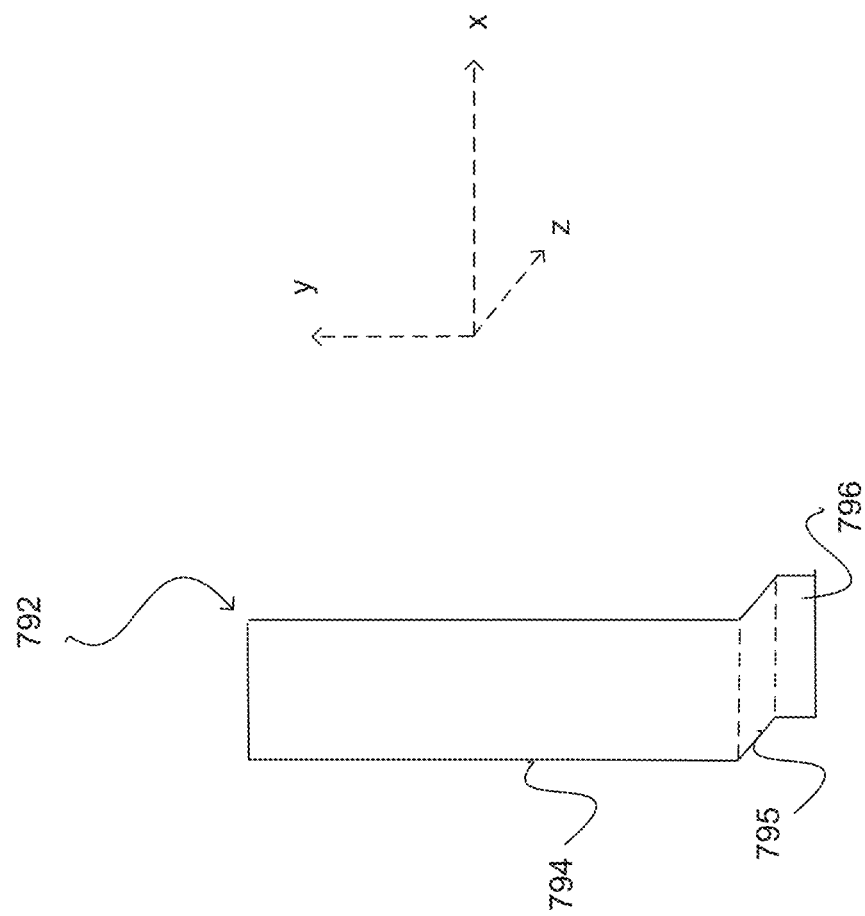

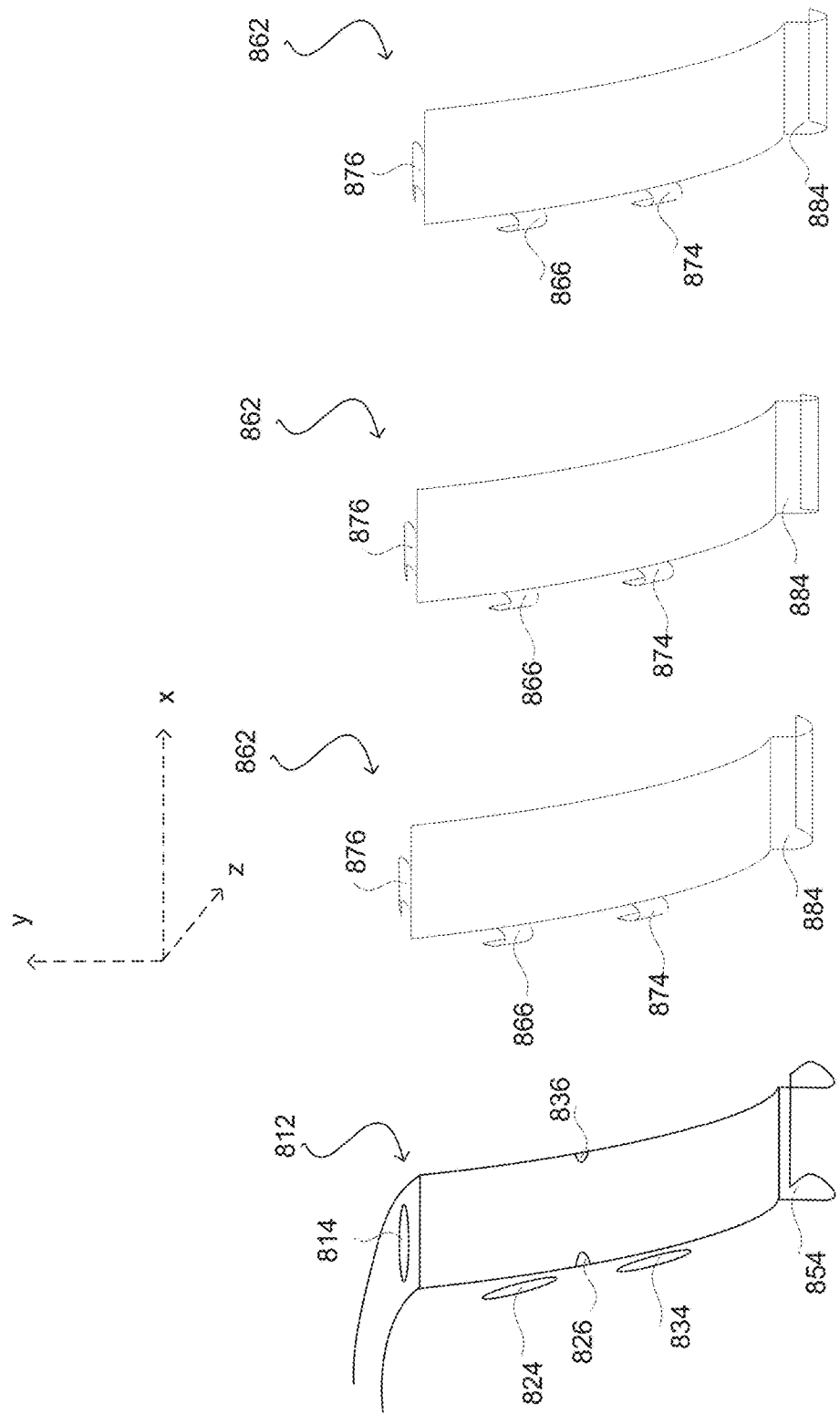

HARDENED SLOT WALLS IN A SKEW SHIFTING CONTINUOUS VARIABLE PLANETARY SYSTEM

PRIORITY CLAIM

This application claims benefit of and hereby incorporates by reference U.S. provisional application Ser. No. 63/359,524, entitled "HARDENED SLOT WALLS IN A SKEW SHIFTING CVP," filed on Jul. 8, 2022, by inventors Brad Pohl et al., and further incorporates by reference U.S. Pat. No. 11,174,922.

TECHNICAL FIELD

This invention relates generally to systems and methods for protecting carriers to maintain a transmission ratio in a continuous variable planetary (CVP) system.

BACKGROUND

A continuously variable planetary (CVP) system is a specific type of continuously variable transmission (CVT) used in vehicles such as bicycles, trucks and aircraft and in machines such as turbines. In a CVP system, transmission ratios and torque are controlled via an assembly of rotating and tilting spherical planets operating between input and output rings of a transmission. In some embodiments, the planets are held in place by two carriers. Rotation of one carrier relative to the other results in skew, which is counteracted by tilting of the planets. Such tilting results in change of contact diameters between the planets and the input and output rings. The different contact diameters result in different speeds at which the input and output rings rotate, which effectively controls the transmission ratio of the transmission. When the input ring contacts the planets at positions with larger contact diameters than the output ring, the input ring will spin more quickly than the output ring, indicative of an underdrive condition. Similarly, when the output ring contacts the planets at positions with larger contact diameters than the input ring, the output ring will spin more quickly than the input ring, indicative of an overdrive condition. Thus, tilting of the planets controls the transmission ratio, as well as the torque ratio.

SUMMARY

The inventors herein have recognized that, over time, mechanical contact and/or interaction between components in a continuously variable planetary (CVP) system results in material wear and tear, which has been found to cause deterioration in the range of transmission ratios available to the CVP. One particular interaction on a skew-shifting CVP, namely, the interaction between the planet axles and the carriers that support them, has been determined to cause significant wear and shorten the lifespan of the CVP. In the skew-shifting CVP, when the two carriers are rotated relative to each other, the planets and planet axles are caused to skew, causing a first interaction between the planet axles and the slots of the two carriers. The skew induces the planets and planet axles to tilt. Tilting of the planet axles causes another interaction between the end caps and the slots of the two carriers. These interactions have been found to cause wear primarily to the slot walls, which has been found to cause a reduction in the range of planet tilt and thus a reduction in the range of transmission ratios available. Further, metallic particles shed from the carriers due to the mechanical wear contaminates the traction fluid, which causes further degradation of other CVP components exposed to the traction fluid, such as other rolling contacts.

To mitigate or eliminate mechanical abrasion of the slot walls, embodiments include a protective (e.g., metallic or other wear or wear-resistant) layer positioned between the slot walls of the carriers and the end caps. In some embodiments, the protective layer may be affixed to each of the slot walls, possibly on the forward-facing slot wall and/or rear-facing slot wall of each slot of each carrier. In some embodiments, the protective layer may be positioned on only the forward-facing slot wall or only on the rear-facing slot wall of all of the slots of one or both carriers.

In some embodiments, the protective layer may be a substantially thin mechanical element. In some embodiments, the protective layer may be formed from metallic material, such as a ferrous alloy. In some embodiments, the protective layer may be formed from steel such as carbon steel, hardened steel with higher carbon content, mild steel, or stainless steel.

In some embodiments, the protective layer may be affixed, retained, and/or bonded to the slot wall. In some embodiments, the protective layer may be affixed or retained using mechanical attachment features. The mechanical features may include one or more protective layer attachment features such as appendages, protrusions, extensions, or tabs (hereinafter "tabs") that are configured to secure the protective layer to the slot wall. The mechanical features may include one or more slot wall attachment features, such as a pocket (open or closed), groove, cavity, recess, indentation, conduit, ridge, clip, or other opening. In some embodiments, to affix a protective layer to a slot wall, the tabs of the protective layer may be bent, folded, or wrapped around a pocket of the slot wall. The protective layer may be folded and/or adapted to conform to a contour or a shape of the slot wall. In some embodiments, the protective layer may be fixed rigidly and securely to the slot wall without affecting mechanical structure or properties of the carrier. In some embodiments, the protective layer may be bonded directly to the slot wall. In some embodiments, the protective layer can be snapped, fastened, secured, or otherwise affixed in place by way of spring action between tabs and carrier pocket features. In some embodiments, the protective layer may fit partially or fully within a recess formed in the slot wall of the carrier, and in addition to all the other forms of fastening and retention mentioned elsewhere herein, the protective layer may be retained by press-fitting or interference fitting into such a slot wall recess.

In some embodiments, the present invention provides a continuous variable planetary (CVP) system that comprises a first carrier having a slot, the slot having one or more slot walls; a second carrier, at least one of the first carrier or second carrier being rotatable relative to the other; at least one planetary assembly coupled between the first carrier and the second carrier, each planetary assembly including a planet, a planet axle, and an end cap on at least one end of the planet axle, the end cap disposed within the slot, rotation of first carrier relative to the second carrier inducing a skew condition in the planet axle and thereby inducing a tilt condition on the planet axle; and a protective layer affixed against at least one of the one or more slot walls, the protective layer including one or more protective layer attachment features configured to attach to one or more slot wall attachment features.

In some embodiments, the present invention provides a continuous variable planetary (CVP) system that comprises a first carrier having a plurality of first slots, each first slot having one or more first slot walls, each of the plurality of first slots having a plurality of first slot wall attachment features: a second carrier having a plurality of second slots, each second slot having one or more second slot walls, each of the plurality of second slots having a plurality of second slot wall attachment features, at least one of the first carrier or second carrier being rotatable relative to the other; a plurality of planetary assemblies coupled between the first carrier and the second carrier, each planetary assembly including a planet, a planet axle, a first end cap on a first end of the planet axle, and a second end cap on a second end of the planet axle, each first end cap disposed within one of the plurality of first slots, each second end cap disposed within one of the plurality of second slots, rotation of first carrier relative to the second carrier inducing a skew condition in the planet axle and thereby inducing a tilt condition on the planet axle; and a protective layer affixed against at least one of the one or more first slot walls of each first slot and against at least one of the one or more second slot walls of each second slot, the protective layer including one or more protective layer attachment features configured to attach to one of the one or more first slot wall attachment features or of the one or more second slot wall attachment features.

The protective layer may be metallic, made from a ferrous alloy, made from steel, or made from carbon steel. The first carrier may be rotatable. The second carrier may be rotatable. Both the first and second carriers may be rotatable. The slot wall may be flat or curved. The one or more protective layer attachment features may comprise one or more tabs. The one or more slot wall attachment features may comprise one or more pockets. The one or more tabs include bent portions or curved portions. The one or more pockets may include a pocket at the bottom of the slot wall, one or more open through to the back side of the carrier, and/or one or more front pockets. The first carrier and the second carrier may comprise magnesium, aluminum, steel, plastic or any material suitable to manage the loads applied. The protective layer may comprise a steel layer with a thickness of between 0.05 mm and 0.3 mm. The protected slot wall may include only the rear slot wall. The protected slot wall may include only the front slot wall. The one or more slot wall attachment features may comprise a clip. The slot wall attachment features may have spring action for a snapping on or a press fit effect. The slot wall attachment features may be formed into one or more recesses formed in the slot wall in order to at least partially house the slot wall protective layer.

BRIEF DESCRIPTION OF THE DRAWINGS

FIGS. 7A-7J are diagrams illustrating various alternatives of protective layers, in accordance with some embodiments of the present invention.

FIGS. 8A-8B are diagrams illustrating slot walls with slot wall attachment features, in accordance with some embodiments of the present invention.

FIGS. 8C-8E are diagrams illustrating various alternatives of protective layers, in accordance with some embodiments of the present invention, consistent and complementary with FIG. 8B.

DETAILED DESCRIPTION

Figure 1:
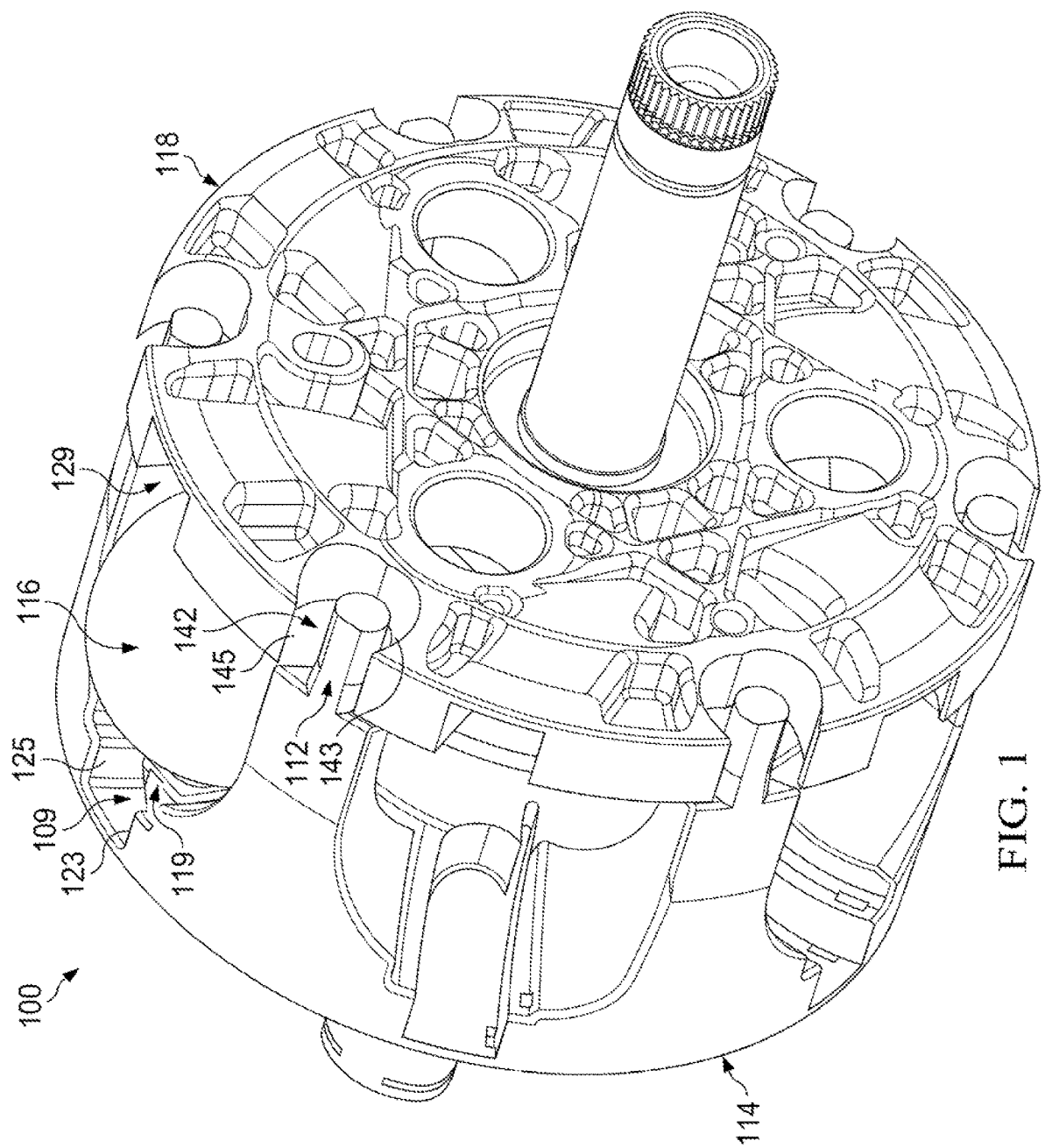
FIGS. 1, 2A, and 2B are diagrams illustrating a continuously variable planetary (CVP) system without a protective layer on a slot wall of a carrier.

The following description is provided to enable a person skilled in the art to make and use various embodiments of the invention. Modifications are possible. The generic principles defined herein may be applied to the disclosed and other embodiments without departing from the spirit and scope of the invention. Thus, the claims are not intended to be limited to the embodiments disclosed, but are to be accorded the widest scope consistent with the principles, features and teachings herein.

The inventors herein have recognized that, over time, mechanical contact and/or interaction between components in a continuously variable planetary (CVP) system results in material wear and tear, which has been found to cause degraded performance of or deterioration in the range of transmission ratios available to the CVP. One particular interaction on a skew-shifting CVP, namely, the interaction between the planet axles and the carriers that support them, has been determined to cause significant wear and to shorten the lifespan of the CVP. In the skew-shifting CVP, when the two carriers are rotated relative to each other, the planets and planet axles are caused to skew, causing a first interaction between the planet axles and the slots of the two carriers. The skew induces the planets and planet axles to tilt. Tilting of the planet axles causes another interaction between the end caps and the slots of the two carriers. These interactions have been found to cause wear primarily to the slot walls, which has been found to cause a reduction in the range of planet tilt and thus a reduction in the range of transmission ratios available. Further, metallic particles shed from the carriers due to the mechanical wear contaminates the traction fluid, which causes further degradation of other CVP components exposed to the traction fluid, such as other rolling contacts.

To mitigate or eliminate mechanical abrasion of the slot walls, embodiments include a protective (e.g., metallic or other wear or wear-resistant) layer positioned between the slot walls of the carriers and the end caps. In some embodiments, the protective layer may be affixed to each of the slot walls, possibly on the forward-facing slot wall and/or rear-facing slot wall of each slot of each carrier. In some embodiments, the protective layer may be positioned within both the forward-facing slot wall and rear-facing slot wall of one or both carriers. In some embodiments, the protective layer may be positioned on only the forward-facing slot wall or the rear-facing slot wall of all of the slots of one or both carriers. In some embodiments, the protective layer may be positioned on only the forward-facing slot wall or only on the rear-facing slot wall of all slots of one or both carriers. In this description, when an element (e.g., a protective layer) is described as being on or affixed to a surface (e.g., the slot wall), the element may be recessed partially or fully, or embedded partially or fully within, the surface, or a feature thereof, or sitting, lying, or being overlaid on the surface described.

In some embodiments, the protective layer may be a substantially thin mechanical element. In some embodiments, the protective layer may be formed from metallic material, such as a ferrous alloy. In some embodiments, the protective layer may be formed from steel such as carbon steel, hardened steel with higher carbon content, mild steel, or stainless steel.

In some embodiments, the protective layer may be affixed, retained, and/or bonded to, or partially or fully recessed or embedded in, the slot wall. In some embodiments, the protective layer may be affixed using mechanical attachment features. The mechanical attachment features may include one or more protective layer attachment features such as appendages, protrusions, extensions, or tabs (hereinafter "tabs") that are configured to secure and retain the protective layer to the slot wall. The mechanical attachment features may include one or more slot wall attachment features, such as a pocket (open or closed), groove, cavity, indentation, conduit, ridge, clip, or other opening. In some embodiments, to affix a protective layer to a slot wall, the tabs of the protective layer may be bent, folded, or wrapped around a pocket of the slot wall. The protective layer may be folded and/or adapted to conform to a contour or a shape of the slot wall. In some embodiments, the protective layer may be fixed rigidly and securely to the slot wall without affecting mechanical structure or properties of the carrier. In some embodiments, the protective layer may be bonded directly to the slot wall. In some embodiments, the protective layer can be snapped in place by way of spring action between tabs and carrier pocket features.

Although the embodiments herein are shown primarily with regard to pocket-based slot wall attachment features, other slot wall attachment features are possible. Similarly, although the embodiments herein are shown primarily with regard to tab-based protective layer attachment features, other protective layer attachment features are possible.

FIG. 1 illustrates an exemplary CVP system 100, shown without a protective layer on a slot wall. In FIG. 1, a first carrier 114 (e.g., a C2 carrier) and a second carrier 118 (e.g., a C1 carrier) support a set of planet assemblies (although only one planet 116 is shown). The first carrier 114 and the second carrier 118 are configured to rotate relative to one another to induce various skew conditions on each planet axle (shown better in later figures) to control transmission ratios. The various skew conditions induce various amounts of tilt on each planet assembly, including on the planet 116 and its axle. As mentioned above, skewing and tilting cause the end caps to interact with a slot 109 (a C2 slot) of the first carrier 114 and a slot 129 (a C1 slot) of the second carrier 118.

In some embodiments, the first carrier 114 is fixed. In some embodiments, the first carrier 114 is rotatable. In some embodiments, the second carrier 118 is fixed. In some embodiments, the second carrier 118 is rotatable. In some embodiments, both carriers 114 and 118 are rotatable. In some embodiments, the slot 109 and/or the slot 129 may be curved or straight and may be radial or non-radial (offset).

The first carrier 114 may include shift-stop projections 112 that cooperate with cutouts in the second carrier 118 to help maintain boundaries of rotation relative to each other. For example, the second carrier 118 may be permitted to rotate clockwise until the shift-stop projections 112 of the first carrier 114 hit first walls or first wall portions 143 within a cutout, opening, or gap (e.g., a gap 142) of the second carrier 118. Similarly, the second carrier 118 may be permitted to rotate counterclockwise until the shift-stop projections 112 hit second walls or second wall portions 145 within the gap 142 of the second carrier 118.

Figure 2A:
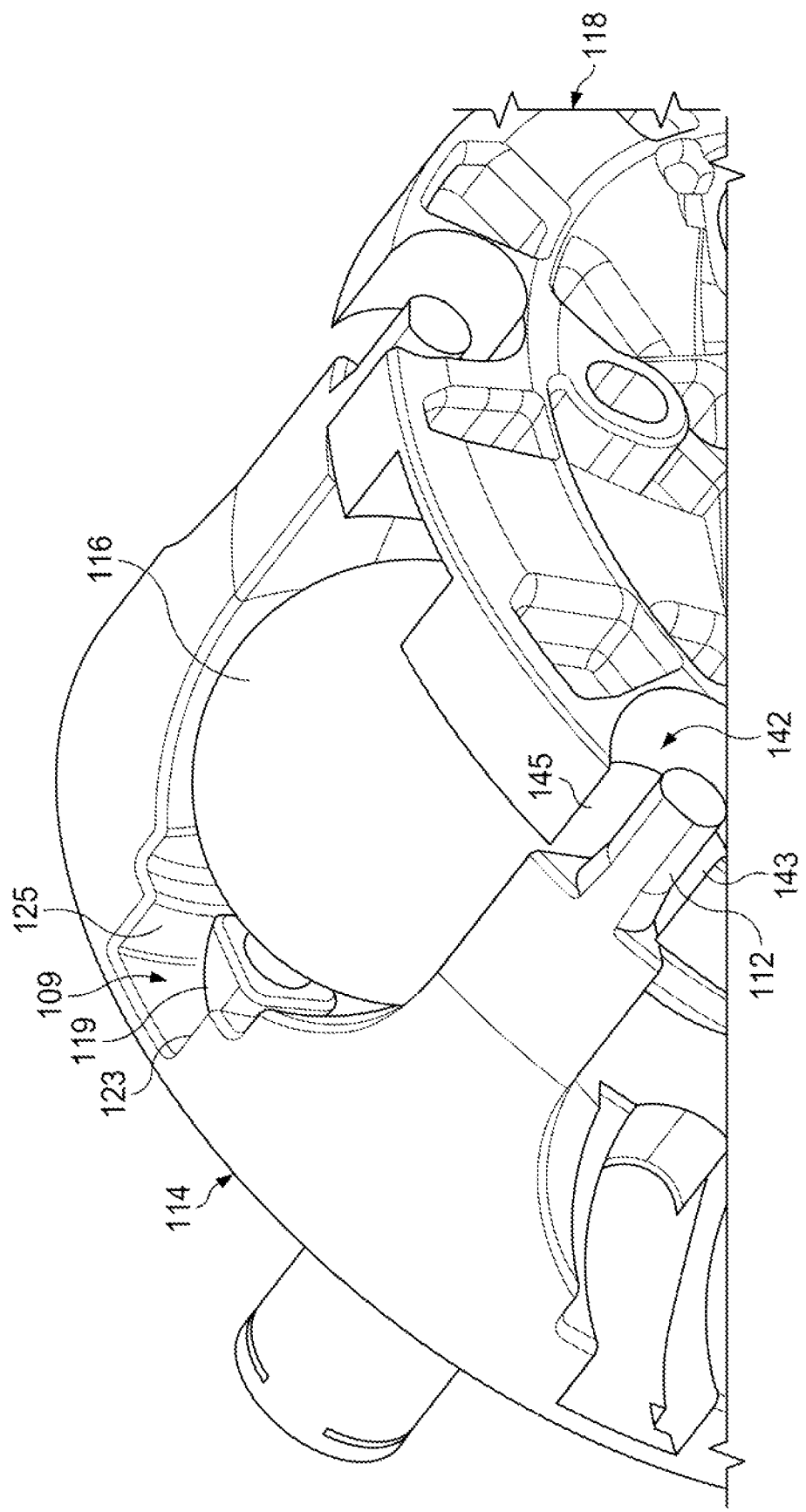
Figure 2B:
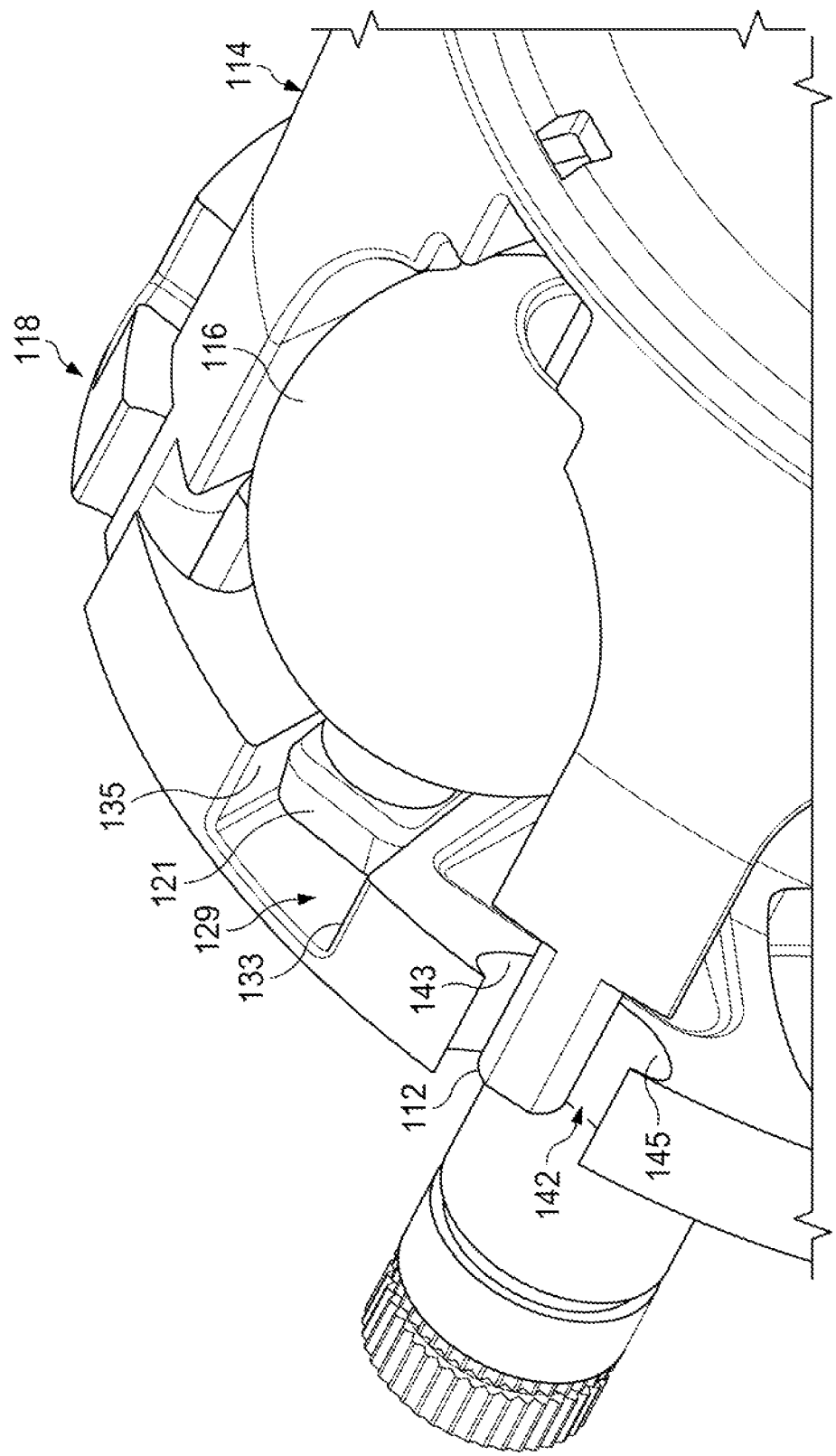

FIG. 2A illustrates a first-side portion of the CVP system 100. As can be seen in FIG. 2A, movement of a first cap 119 (e.g., a C2 cap or a C2 end cap) causes interaction with one or more slot walls 123 and 125 of the slot 109 of the first carrier 114. FIG. 2B illustrates a second-side portion of the CVP system 100. As can be seen in FIG. 2B, movement of a second cap 121 (e.g., a C2 cap or a C2 end cap) causes interaction with one or more slot walls 133 and 135 of the slot 129 of the second carrier 118. The action of power transmission through the CVP system 100 causes loads to be generated between the end caps 119 and 121 and respective slot walls 123, 135, 133, 135. The combination of load and the sweeping action of changing transmission ratio produces wear.

The first carrier 114 and/or the second carrier 118 may be made from a suitable material, such as a metallic material including magnesium or aluminum. Each of the first caps 119 and the second caps 121 may be made from any suitable material, such as a thermoplastic, for example, polyetheretherketone (PEEK), polyethylene terephthalate (PET), or polyphenylene sulfide (PPS), or metallic materials like steel, sintered powder metal, metal injection molded materials.

Figure 3A:
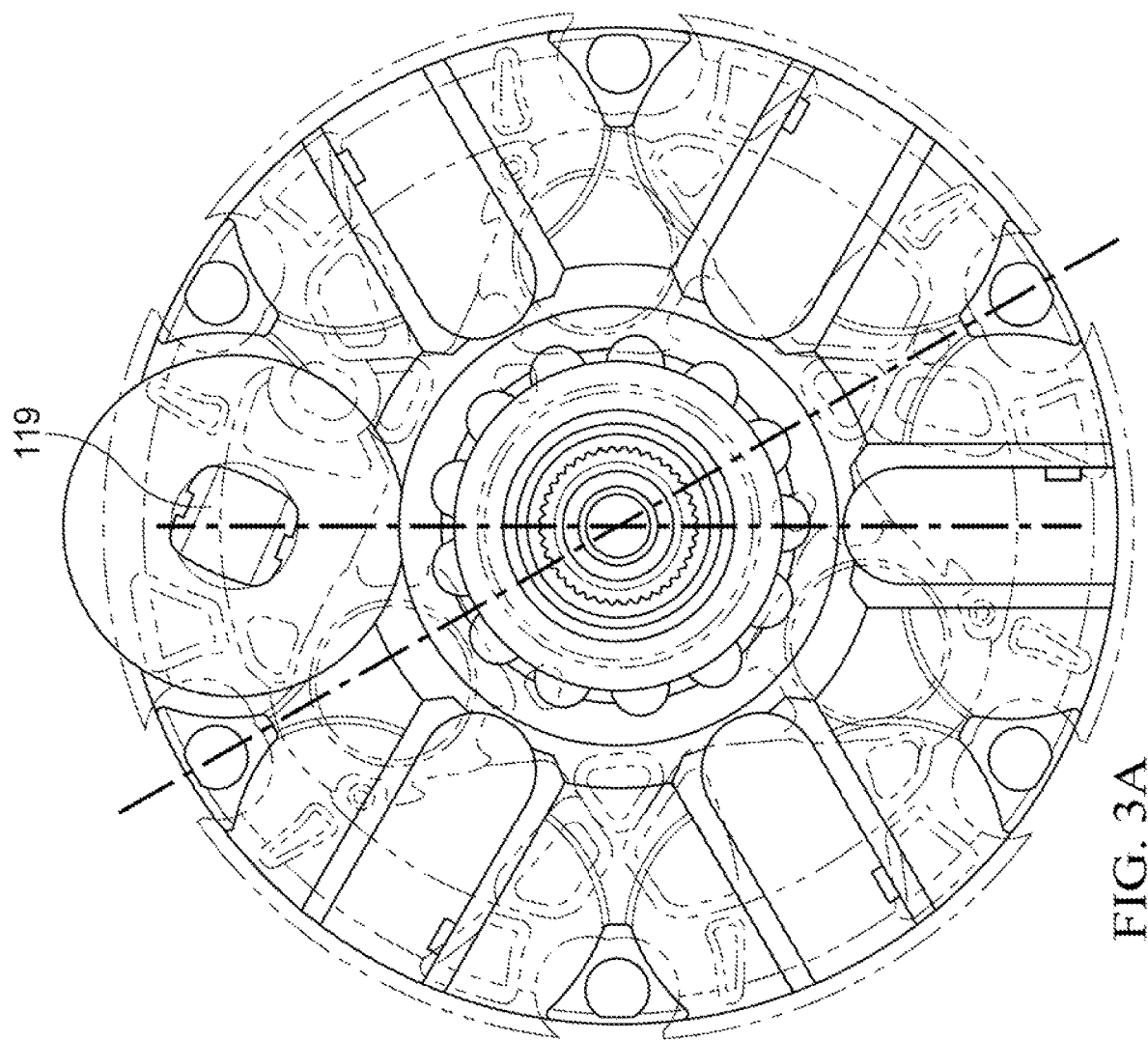
FIGS. 3A and 3B are diagrams illustrating the CVP system with a 1:1 transmission ratio.
Figure 3B:
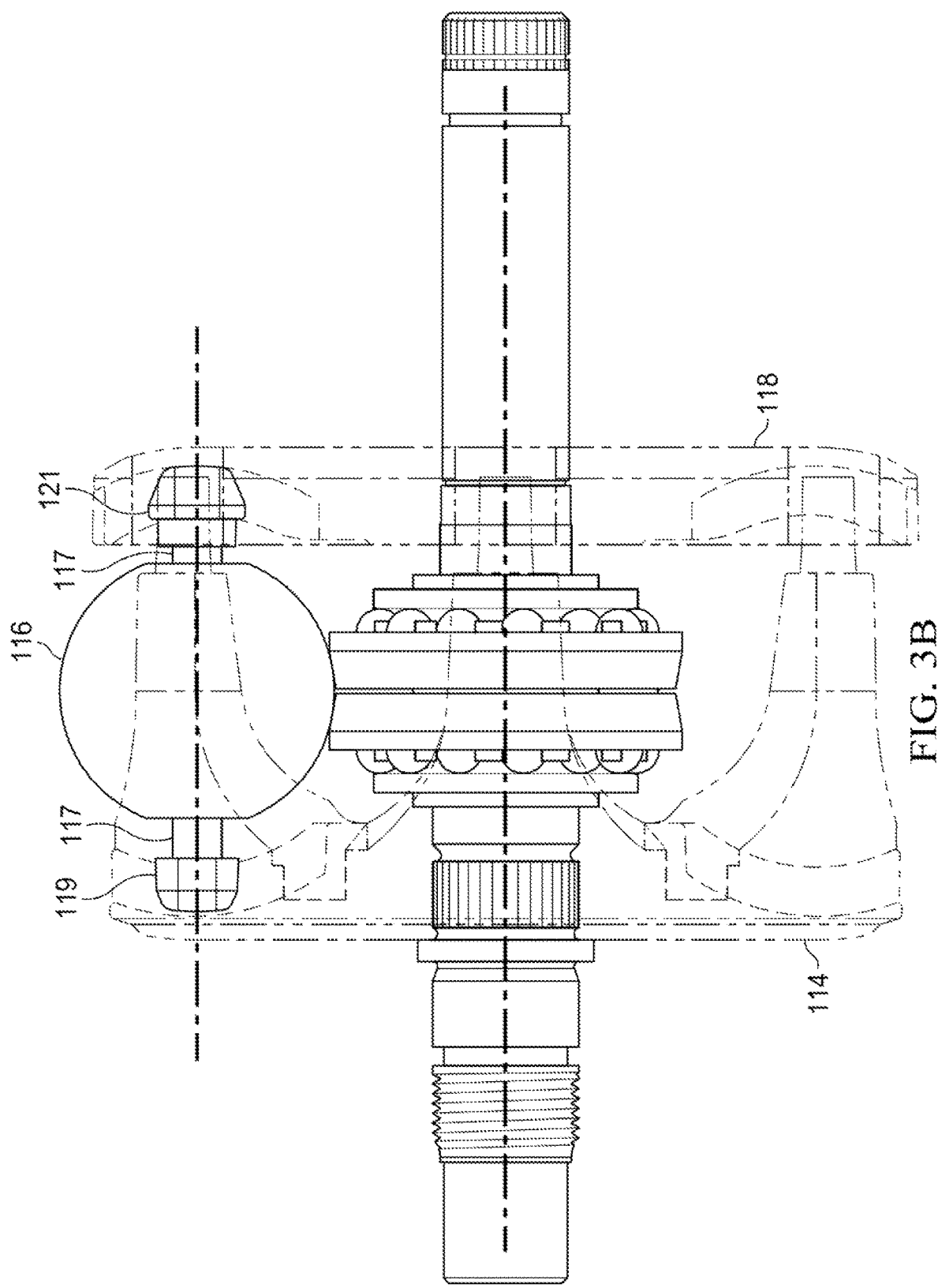

FIGS. 3A and 3B are diagrams illustrating the CVP 100 in a 1:1 transmission ratio. The planet 116 and its axle 117 are positioned in a neutral, unskewed position. The first cap 119 and the second cap 121 are positioned on opposite ends of the axle 117.

Figure 4A:
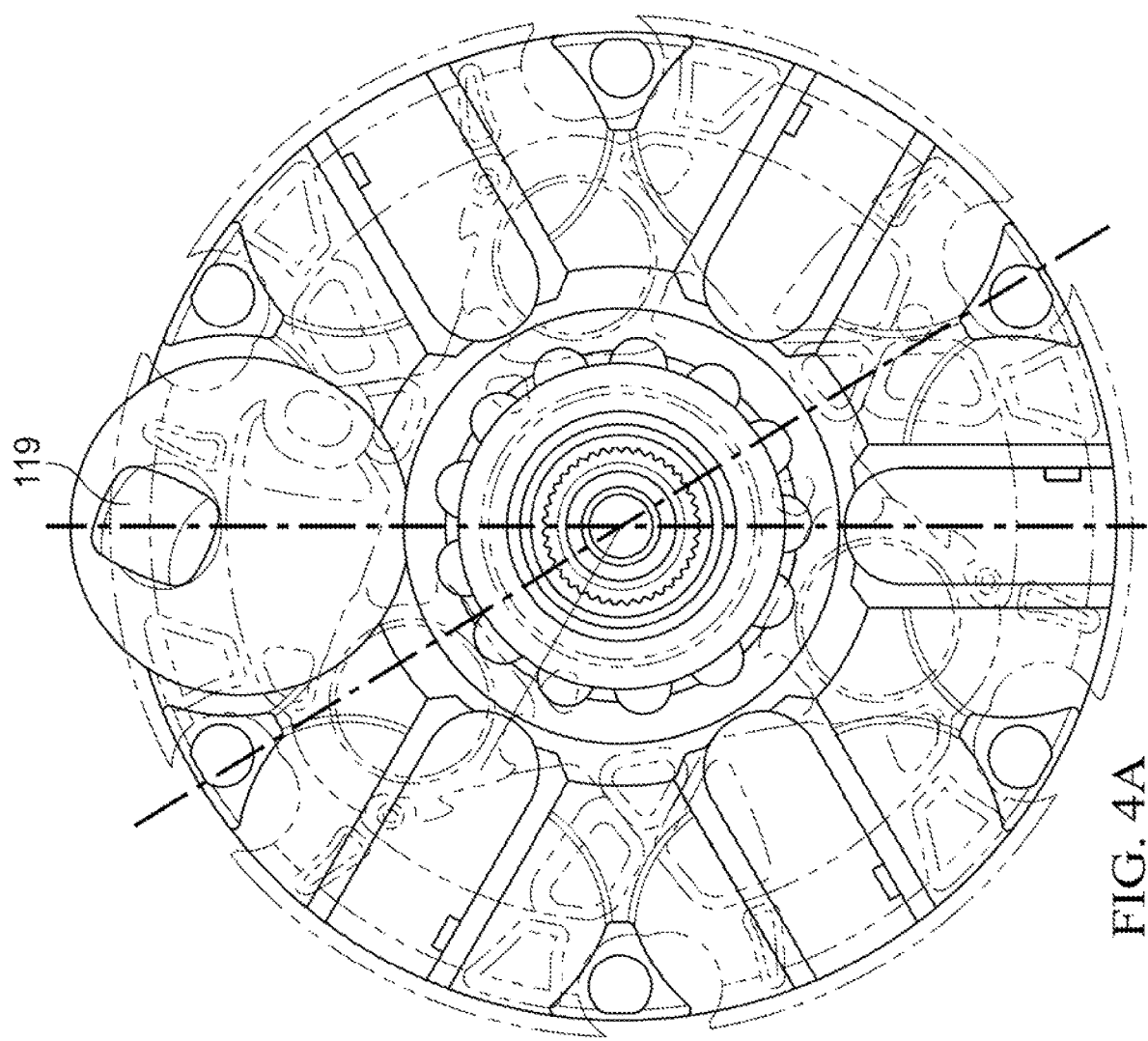
FIGS. 4A and 4B are diagrams the CVP system in an overdrive condition.
Figure 4B:
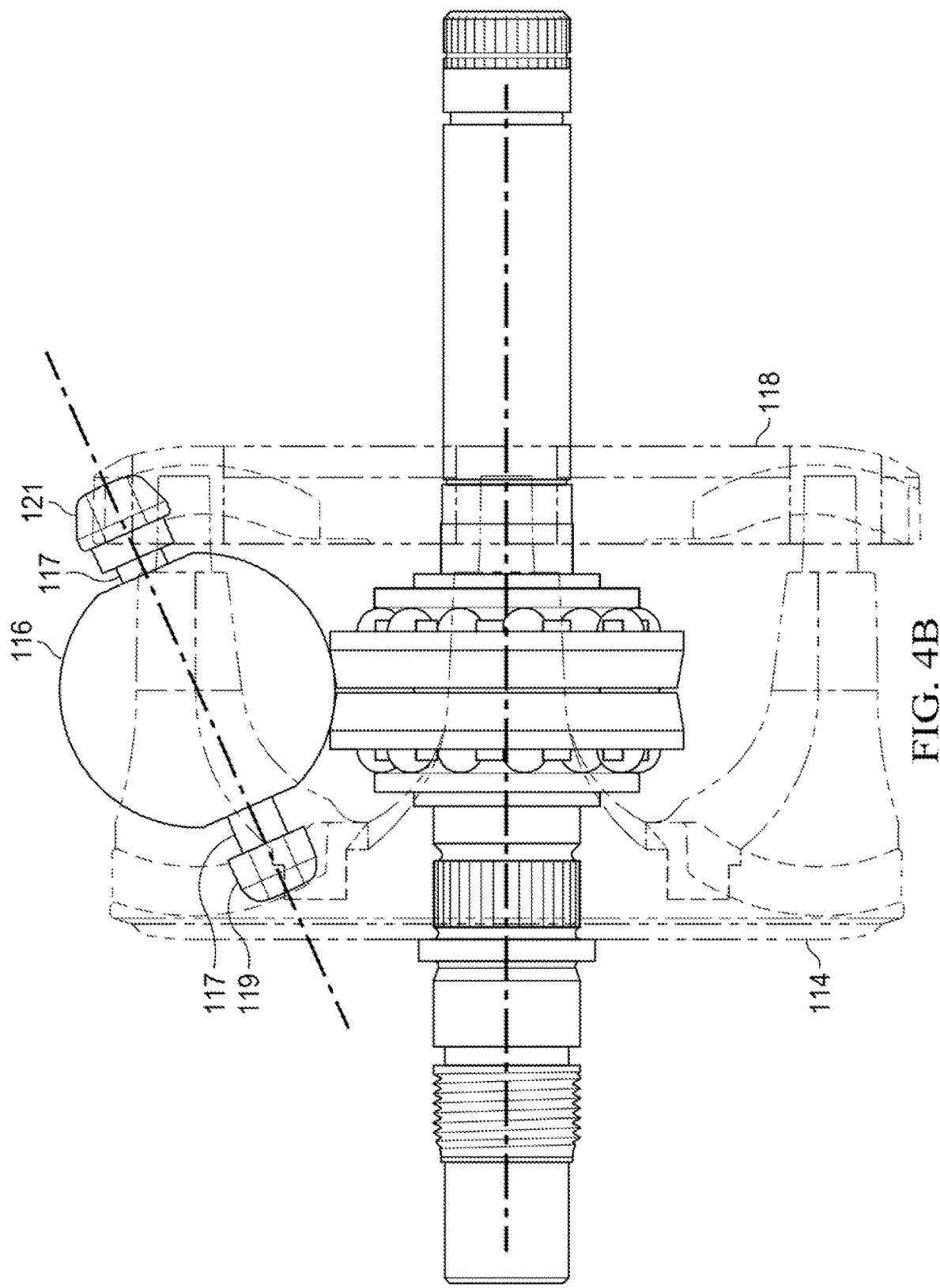

FIGS. 4A and 4B are diagrams illustrating the CVP 100 in an overdrive condition. In FIGS. 4A and 4B, due to rotation of the second carrier 118 relative to the first carrier 114, combined with power transmission through the CVP, the planet 116 tilts to an overdrive condition, causing the first cap 119 to interact with (sweep along) the slot wall 123 and/or slot wall 125 of the first carrier 114 and the second cap 121 to interact with (sweeps along) the slot wall 133 and/or slot wall 135 of the second carrier 118. The action of power transmission through the CVP causes loads to be generated between the end caps and respective slot walls. The combination of load and the sweeping action of changing transmission ratio (tilting planet 116) produces wear as caps slide along slot walls.

Figure 5A:
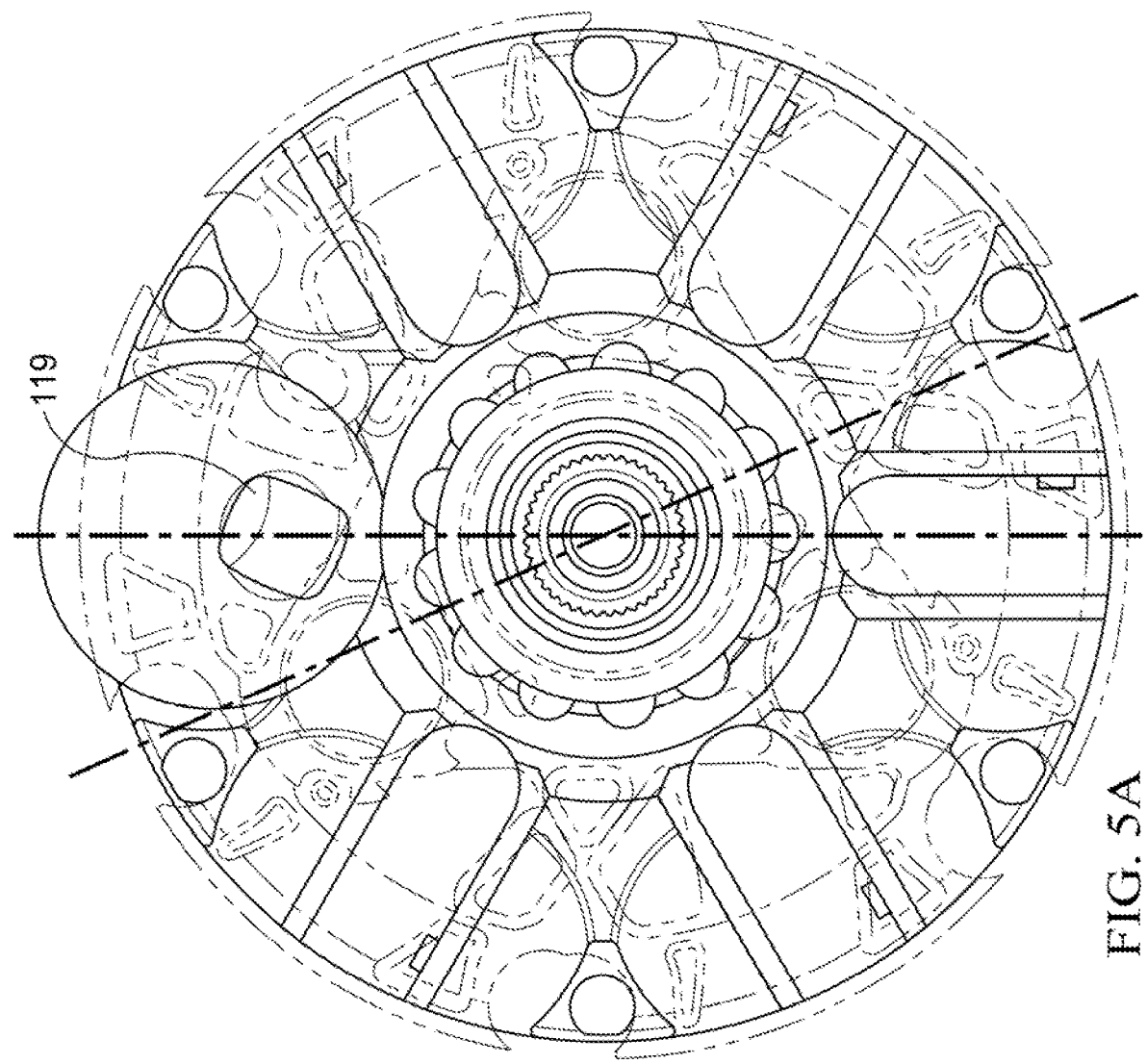
FIGS. 5A and 5B are diagrams illustrating the CVP system in an underdrive condition.
Figure 5B:
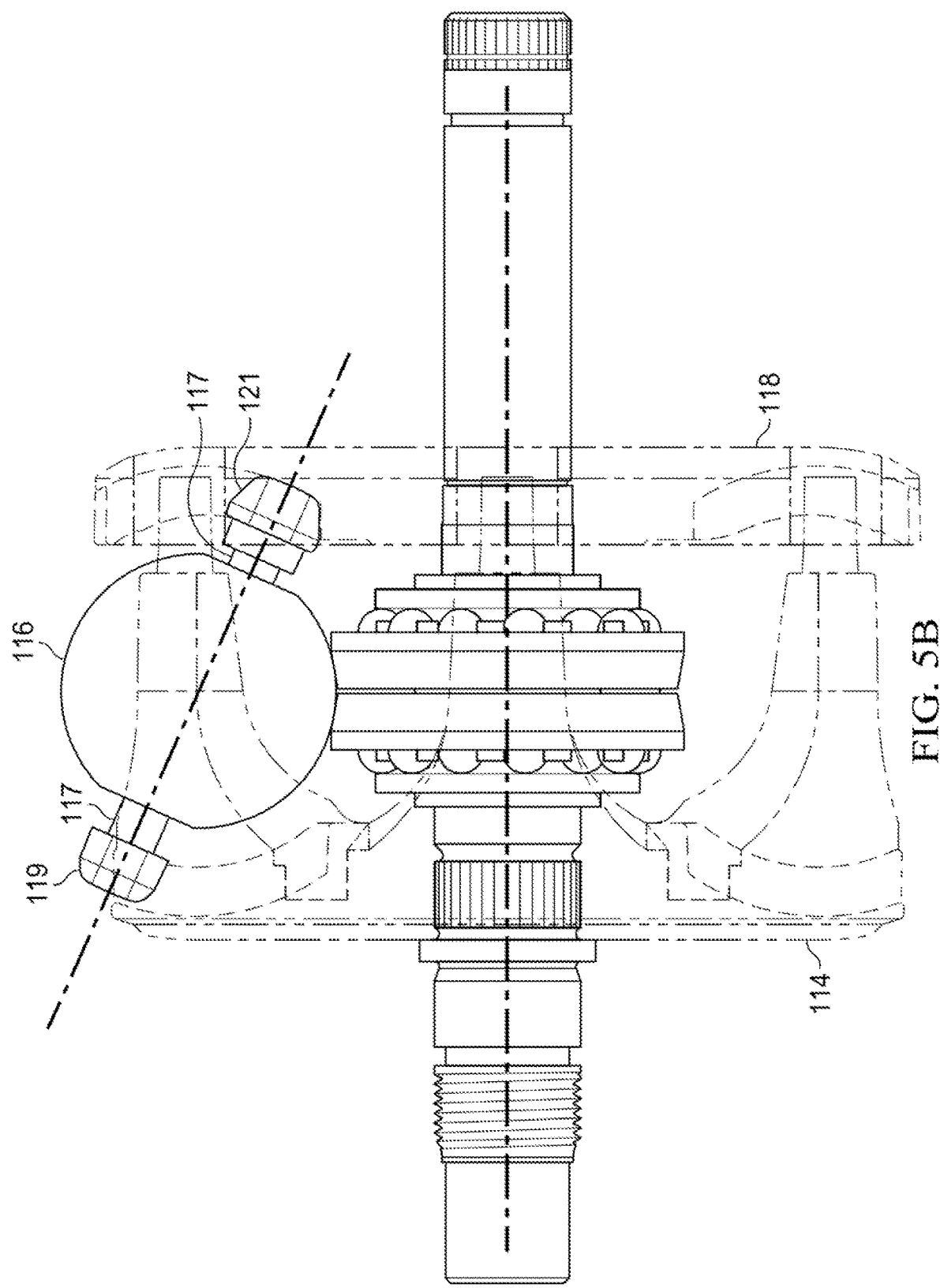

FIGS. 5A and 5B are diagrams illustrating the CVP 100 during in an underdrive condition. In FIGS. 5A and 5B, due to rotation of the second carrier 118 relative to the first carrier 114 in the opposite direction to FIGS. 4A and 4B, the planet 116 tilts to an underdrive condition, causing the first cap 119 to interact with the slot wall 123 and/or slot wall 125 of the first carrier 114 and the second cap 121 to interact with the slot wall 133 and/or slot wall 135 of the second carrier 118. The action of power transmission through the CVP system 100 causes loads to be generated between the end caps and respective slot walls. The combination of load and the sweeping action of changing transmission ratio (tilting planet 116) produces wear as caps slide along slot walls.

FIGS. 6A-6J are diagrams illustrating a protective layer 602 affixed to a slot wall 620 (which may be implemented as any of the slot walls 123, 125, 133, and/or 135) of a carrier 600, in accordance with some embodiments of the present invention. The protective layer 602 may be affixed, secured, fastened, attached, or bonded to one or more of the slot walls 620 of one or more of the slots in the carrier 600. The first caps 119 and/or the second caps 121 will interact with the protective layer 602 instead of the original slot wall 620, thereby preventing damage to the slot wall 620. Although carrier 600 is shown as a C1 carrier, the teachings apply to a C2 carrier.

The protective layer 602 may include one or more protective layer attachment features such as appendages, protrusions, extensions, or tabs (hereinafter "tabs"), e.g., rear tab 604, front tab 606, and/or bottom tab 608 to secure the protective layer 602 to the slot wall 620. Although three tabs are illustrated in the layer 602, the protective layer 602 may include any number of tabs, including a single tab. In some embodiments, the protective layer 602 may have no tabs. In some embodiments, each of the tabs 604, 606, and/or 608 may conform to, and/or otherwise be configured or bent to securely insert in, fasten to, snap on, lock in or cooperate with a slot wall attachment feature. Such a slot wall attachment feature may include one or more pockets (open or closed), grooves, cavities, indentations, conduits, ridges, clips, or other openings, e.g., front pocket 621, rear pocket 622, and bottom pocket 623. In some embodiments, the protective layer 602 may be press fitted, friction fitted, or interference fitted within a slot wall attachment feature. Although the embodiments herein are shown with regard to pocket-based attachment features, other slot wall attachment features are possible.

In some embodiments, a tab 604, 606 and/or 608 may be affixed within an open pocket (through via) or closed pocket 621, 622 and/or 623. With an open pocket, one or more tabs may traverse through one or both openings, across an entirety of the open pocket. In other embodiments, one or more tabs may be affixed in a pocket opening without passing through the open pocket.

In some embodiments, the slot wall attachment features may be positioned on a side, top, or a bottom of the slot wall 620. The tabs 604, 606, and/or 608 may be bent, curved, folded, wrapped, or otherwise conformed to each of the respective pockets 621, 622, and/or 623. In some embodiments, any of the tabs 604, 606, and/or 608 may include a straight extension, a semicircular extension, a concave extension, a bent extension, and/or an angled extension from a main body of the protective layer 602. In some embodiments, the tabs 606 and/or 608 may be pre-bent to fit into the pockets 621 and/or 622, respectively, while the tab 604 may be initially unfolded or only partially folded.

In some examples, the slot wall 620 may have a radius of curvature of between 5 and 50 millimeters (mm), or any subrange within the aforementioned range, such as between 10 and 40 mm, or between 15 and 30 mm, inclusive. In some embodiments, the slot wall 620 has a concave curvature. In some embodiments, the slot wall 620 is straight. In some embodiments, the slot wall 620 may have an inflection point at which a concave curvature changes to a convex curvature. In some embodiments, the protective layer 602 may be sufficiently flexible to conform to the curvature of the slot wall 620. In some embodiments, the protective layer 602 is pre-formed to the curvature of the slot wall 620.

In some embodiments, the protective layer 602 has a thickness of between 0.05 and 0.5 mm, or any subrange within the aforementioned range, such as between 0.05 and 0.4 mm, or between 0.05 and 0.3 mm. Such a thickness provides sufficient material strength without consuming excessive space or interfering with the end caps 119 and/or 121. In some embodiments, the thickness of the protective layer 602 is uniform. Alternatively, the thickness of the protective layer 602 may be nonuniform. For example, certain regions of the protective layer 602 may have greater thickness, e.g., if they are more likely to be contacted by the caps 119 and/or 121. Thus, thickness of a given region of the layer 602 may be positively correlated to, or based on, a probability and/or a frequency of contact with the caps 119 and/or 121, and/or a force resulting from the contact.

Figure 6A:
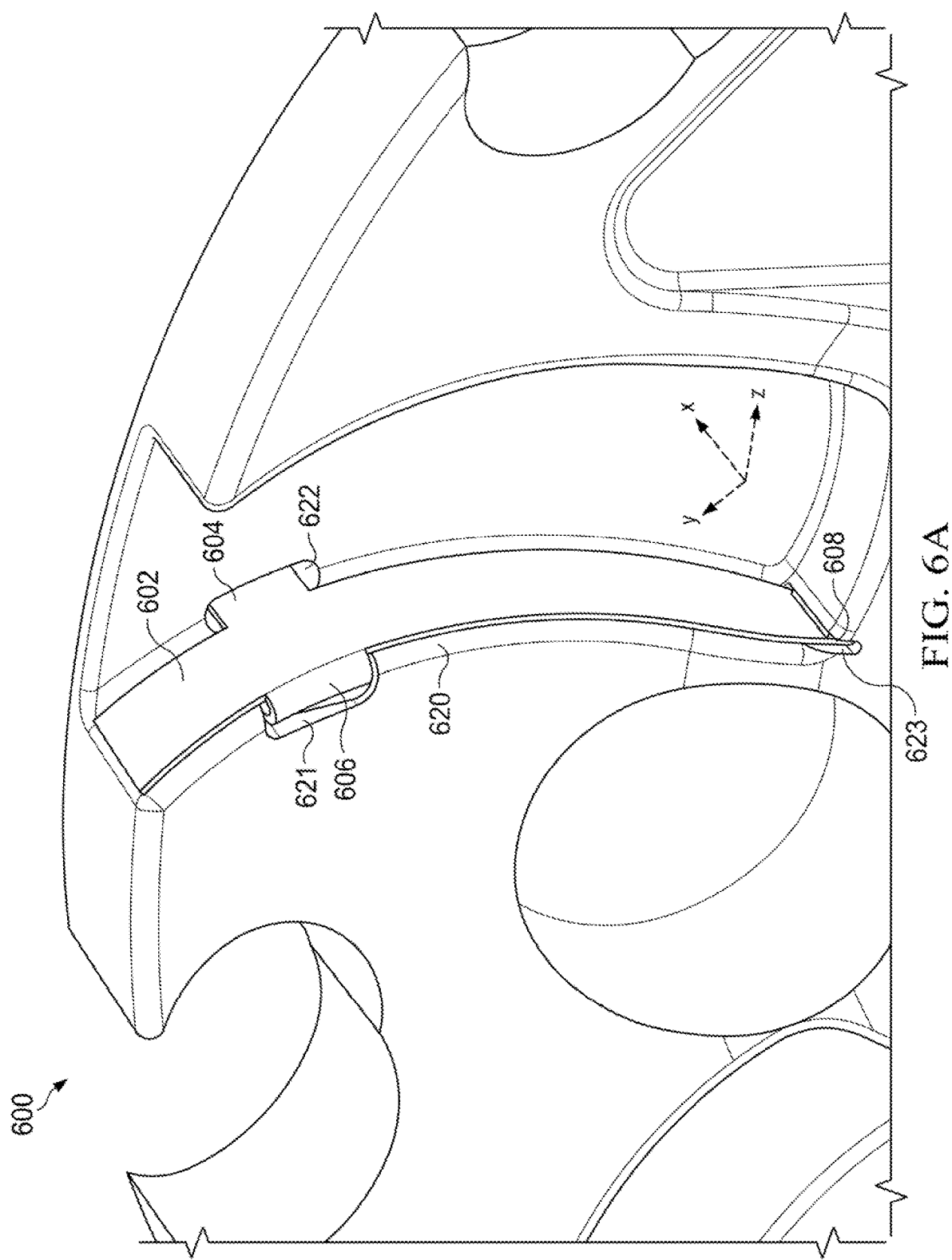
FIGS. 6A-6J are diagrams illustrating a protective layer affixed to a slot wall of a carrier of a CVP system, in accordance with some embodiments of the present invention.
Figure 6B:
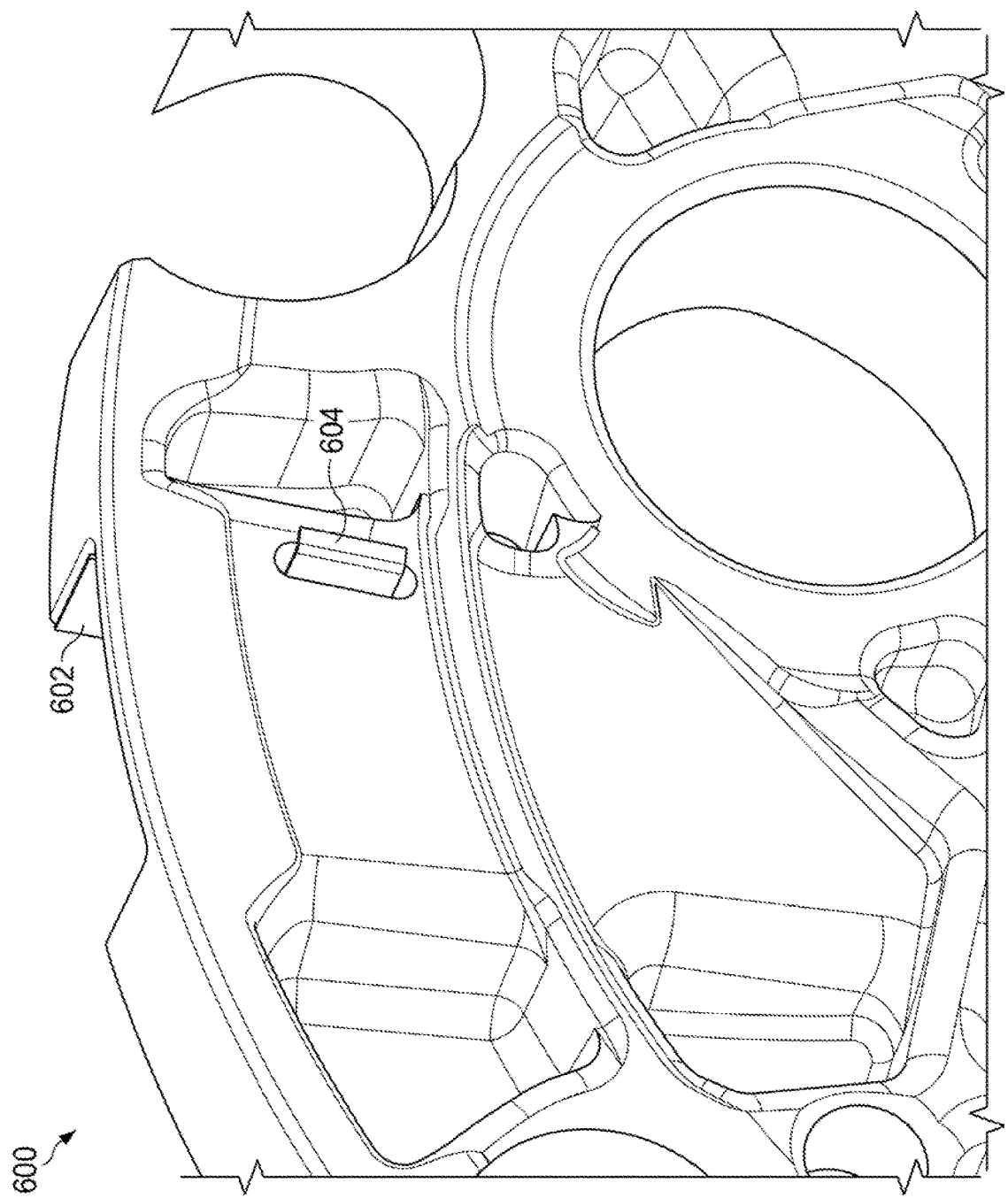

In some embodiments, as illustrated in FIG. 6A, the protective layer 602 may be affixed to the slot wall 620 via sliding or otherwise positioning the bottom tab 608 into the pocket 623. At a same time or thereafter, the front tab 606 may be inserted within the front pocket 621. The front tab 606 may be retained or secured to the front pocket 621, as a result of contact force between the front tab 606 and the front pocket 621, and/or via a press fit, an interference fit, or a friction fit (hereinafter "press fit") between the front tab 606 and the front pocket 621. In some implementations, the front pocket 621 may include a closed pocket. Next, as shown in FIG. 6B, the rear tab 604 may be inserted into and/or pass through the rear open pocket 622 through the rear of the carrier 600. The rear tab 604 traverses through the rear open pocket 622 until its end exits the rear pocket 622. In some embodiments, the end of rear tab 604 may be folded over to secure the rear tab 604 to the back side of the carrier 600. In some embodiments, the end of the rear tab 604 may be pre-folded before insertion through the open pocket 622, and might snap into place. In some embodiments, the rear tab 604 may be retained or secured to the rear open pocket 622 via a press fit between the rear tab 604 and the rear open pocket 622.

Figure 6C:
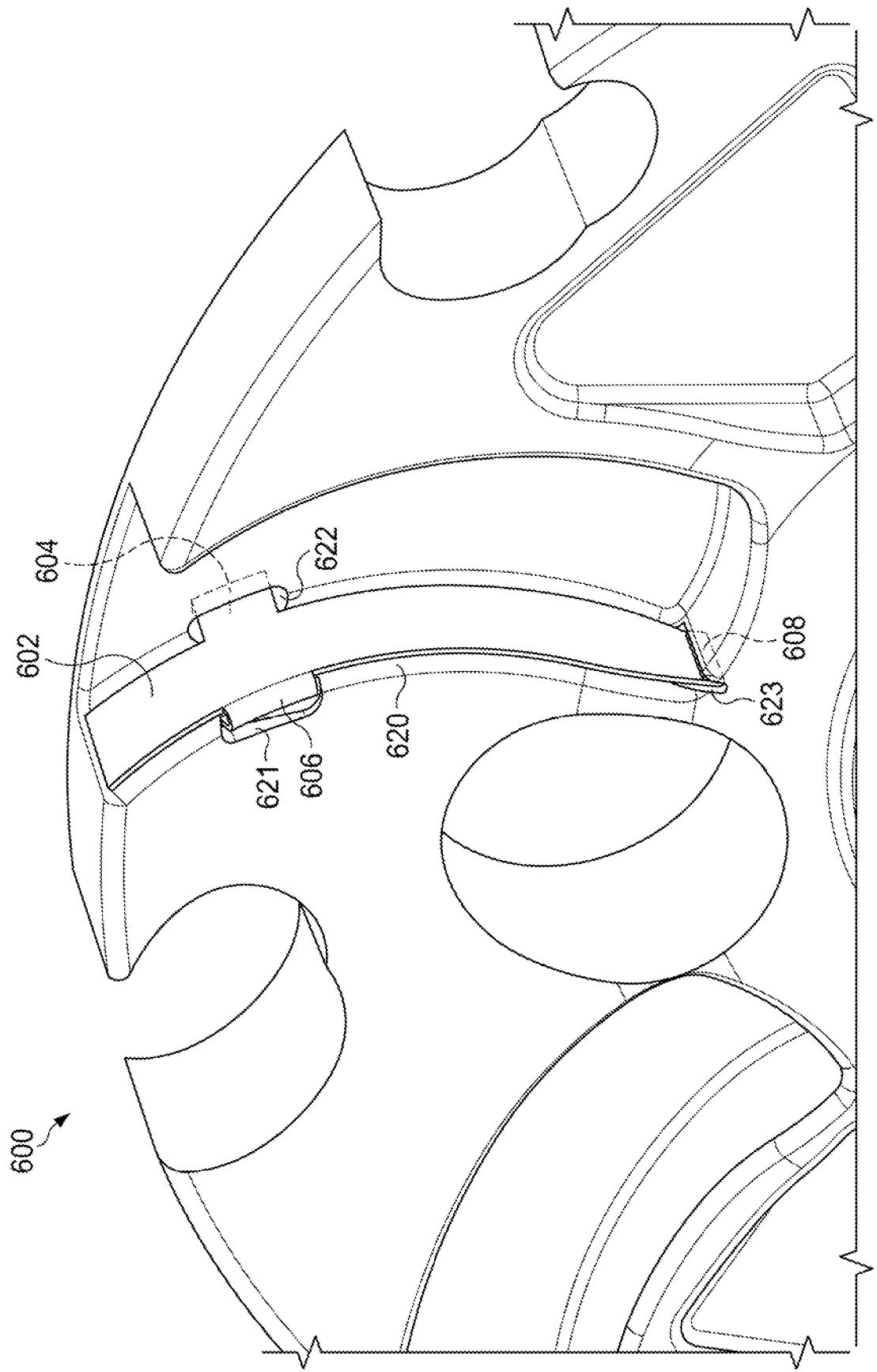

As illustrated in FIG. 6C, in some embodiments, the bottom tab 608 includes a folded portion. The folded portion of bottom tab 608 may be securely positioned into the bottom pocket 623, for example, via a contact force between the bottom tab 608 and the bottom pocket 623, and/or a press fit between the bottom tab 608 and the bottom pocket 623.

Figure 6D:
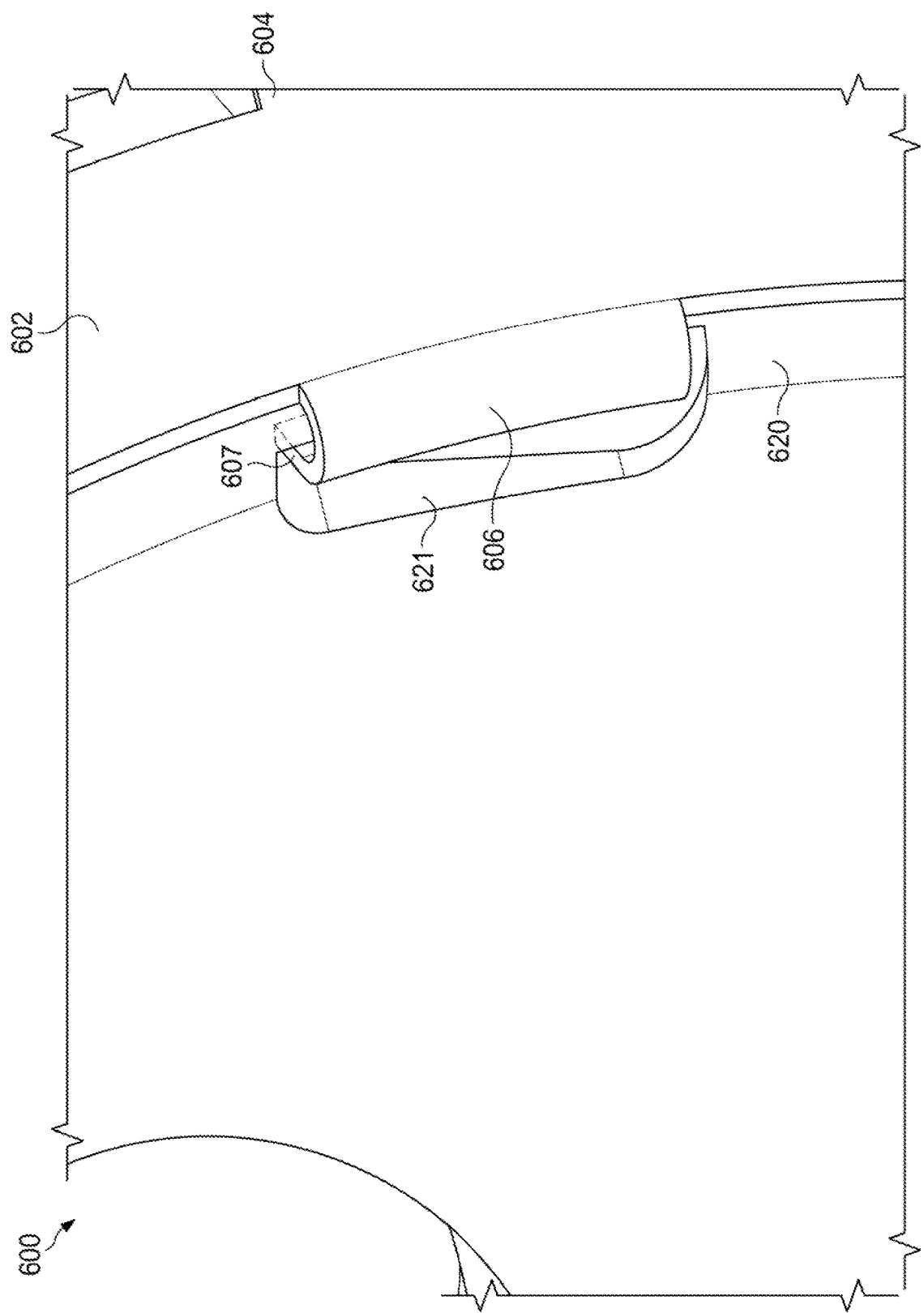

As illustrated in FIG. 6D, in some embodiments, to facilitate the securing of the front tab 606 onto the front pocket 621, the front tab 606 may include curved portion 607, although in some embodiments the shape may be rectangular, V-shaped, other shape or a combination of shapes. The front tab 606 may be positioned into place into the front pocket 621.

Figure 6E:
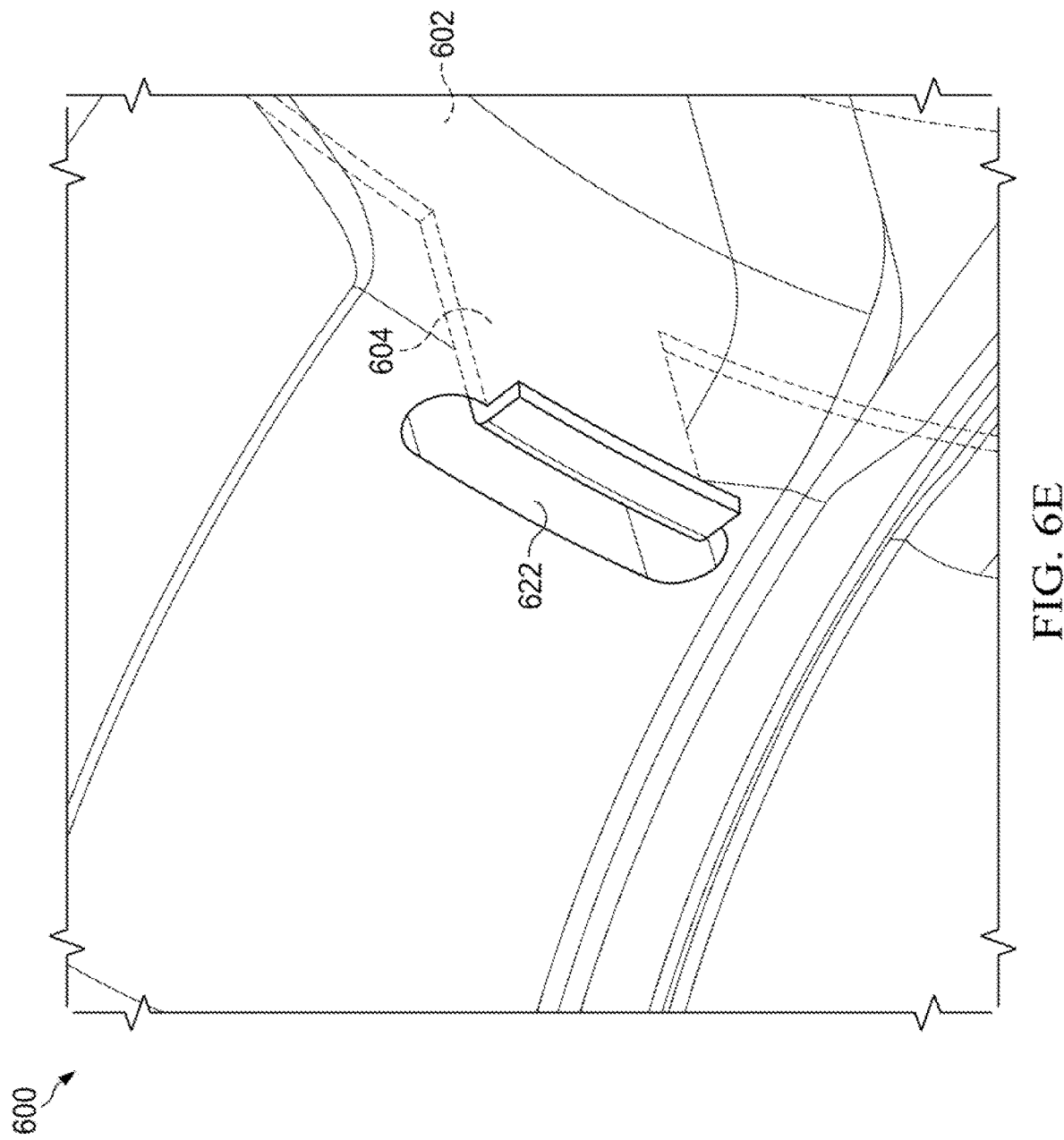

As illustrated in FIG. 6E, in some embodiments, the rear pocket 622 is an open pocket. The rear tab 604 passes through the rear open pocket 622 and the end of the rear tab 604 may be bent over the rear side of the carrier 600 to lock the protective layer 602 in place. As stated above, in some embodiments, the end of the rear tab 604 may be pre-folded before insertion through the rear open pocket 622, and might snap into place.

Figure 6F:
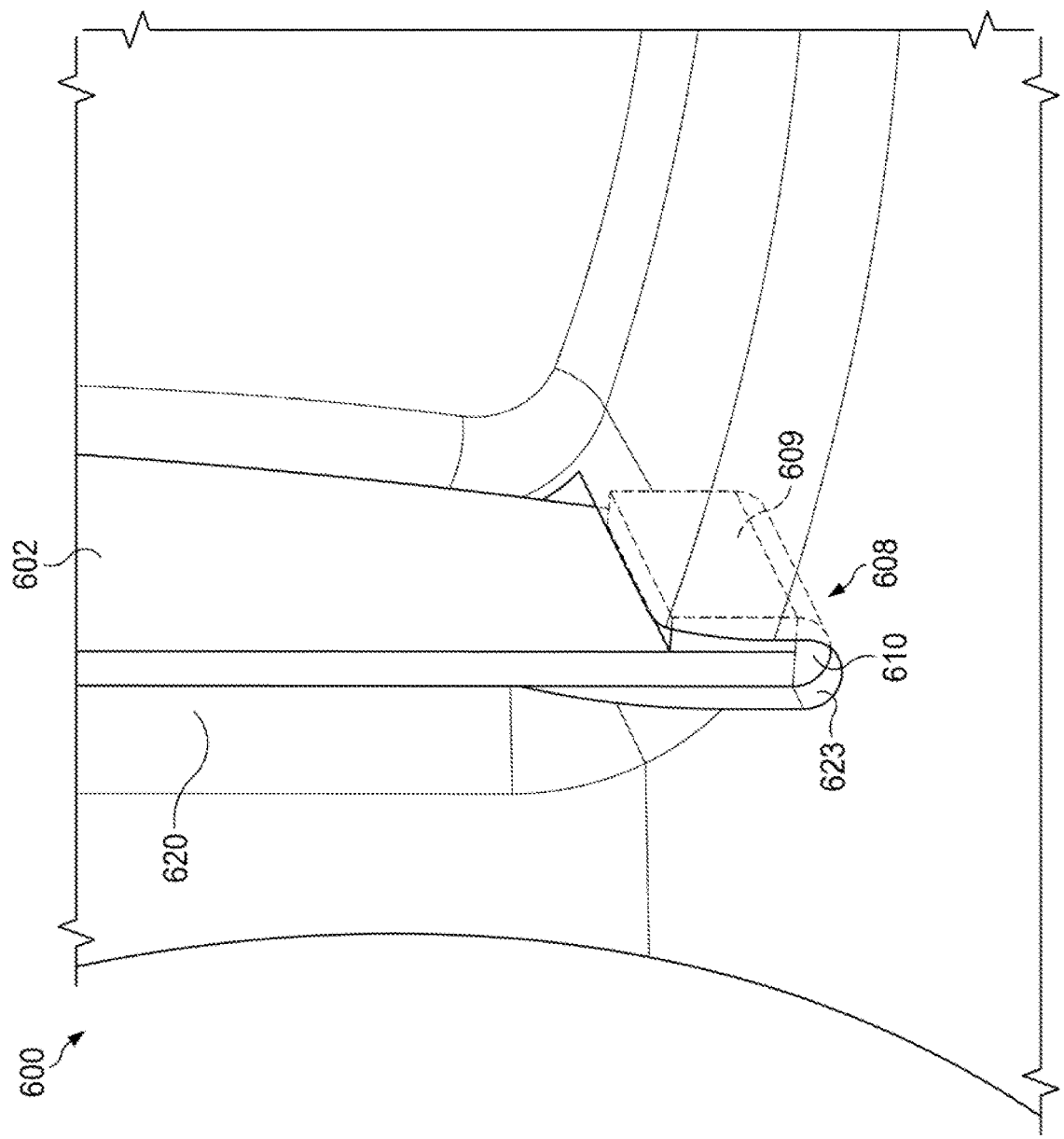

As illustrated in FIG. 6F, in some embodiments, the bottom tab 608 may include folded portion that includes a fold 610 and/or an extension 609. The fold 610 and some or all of the extension 609 may be disposed within the bottom pocket 623. The fold 610 may be folded forward or backward. Such a configuration may permit the bottom tab 608 to be tightly affixed within the bottom pocket 623.

Figure 6G:
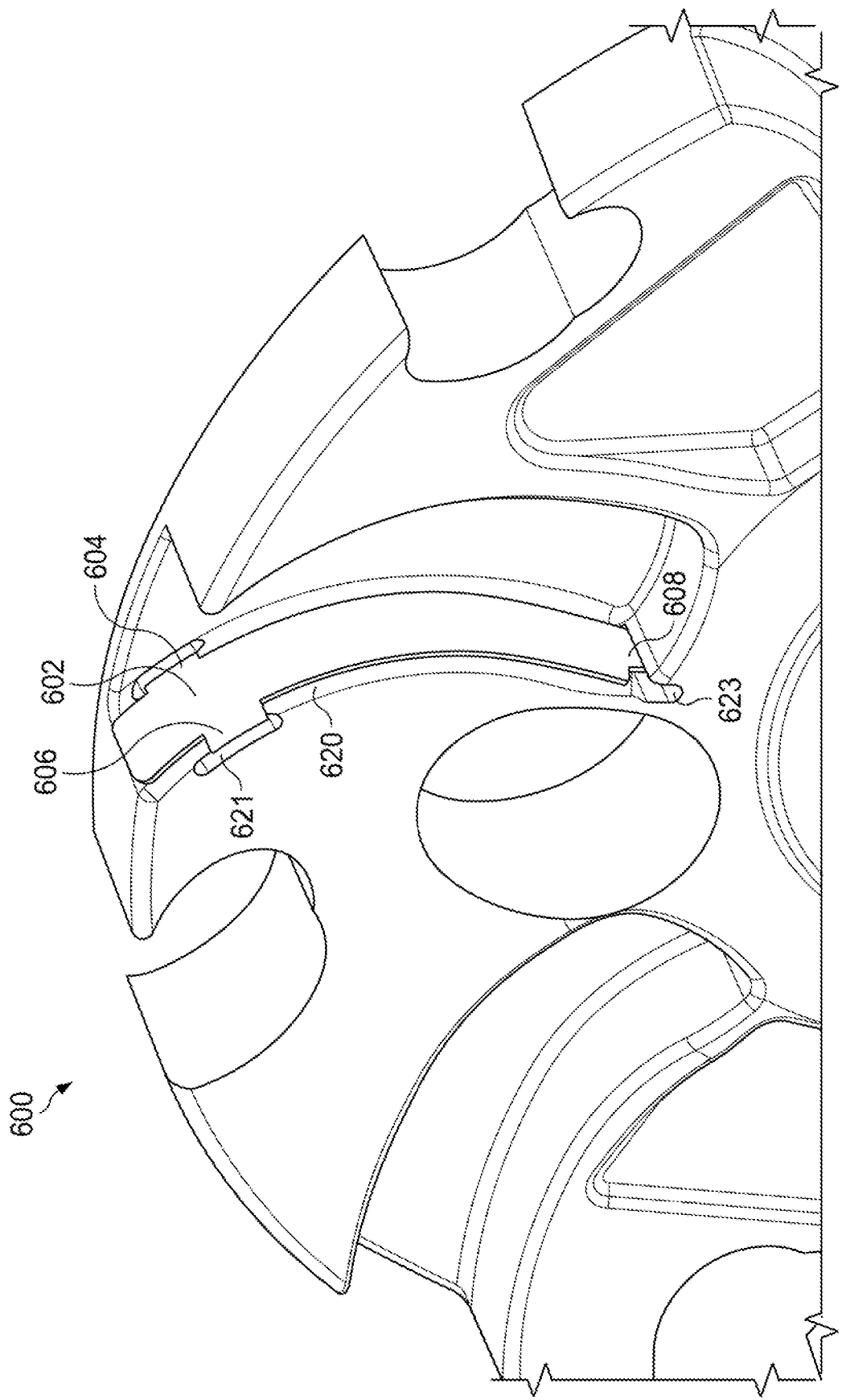

As illustrated in FIG. 6G, in some embodiments, the bottom tab 608 may be secured in place by a clip 623. For example, a press fit may hold the bottom tab 608 within the clip 623 to constrain or control the protective layer 602 within the carrier 600 across six degrees of freedom, including three translational axes and three rotational axes. In some examples, the clip 623 may include one end that may be flexibly moved or pushed away from a wall of the carrier 600 to increase a distance in a depth direction from the wall of the carrier 600. Thus, sufficient space may be provided for a thickness of the protective layer 602, in order to facilitate insertion of the protective layer 602 between the clip 623 and the wall of the carrier 600. Once the clip 623 captures, encloses, sandwiches, or retains the protective layer 602, then the clip 623 may exert sufficient force to tightly constrain the protective layer 602 against the wall of the carrier 600 from movement and/or rotation. In some embodiments, additionally or alternatively, a clip may be positioned on side walls of the carrier 600, and/or a top of the carrier 600.

Figure 6H:
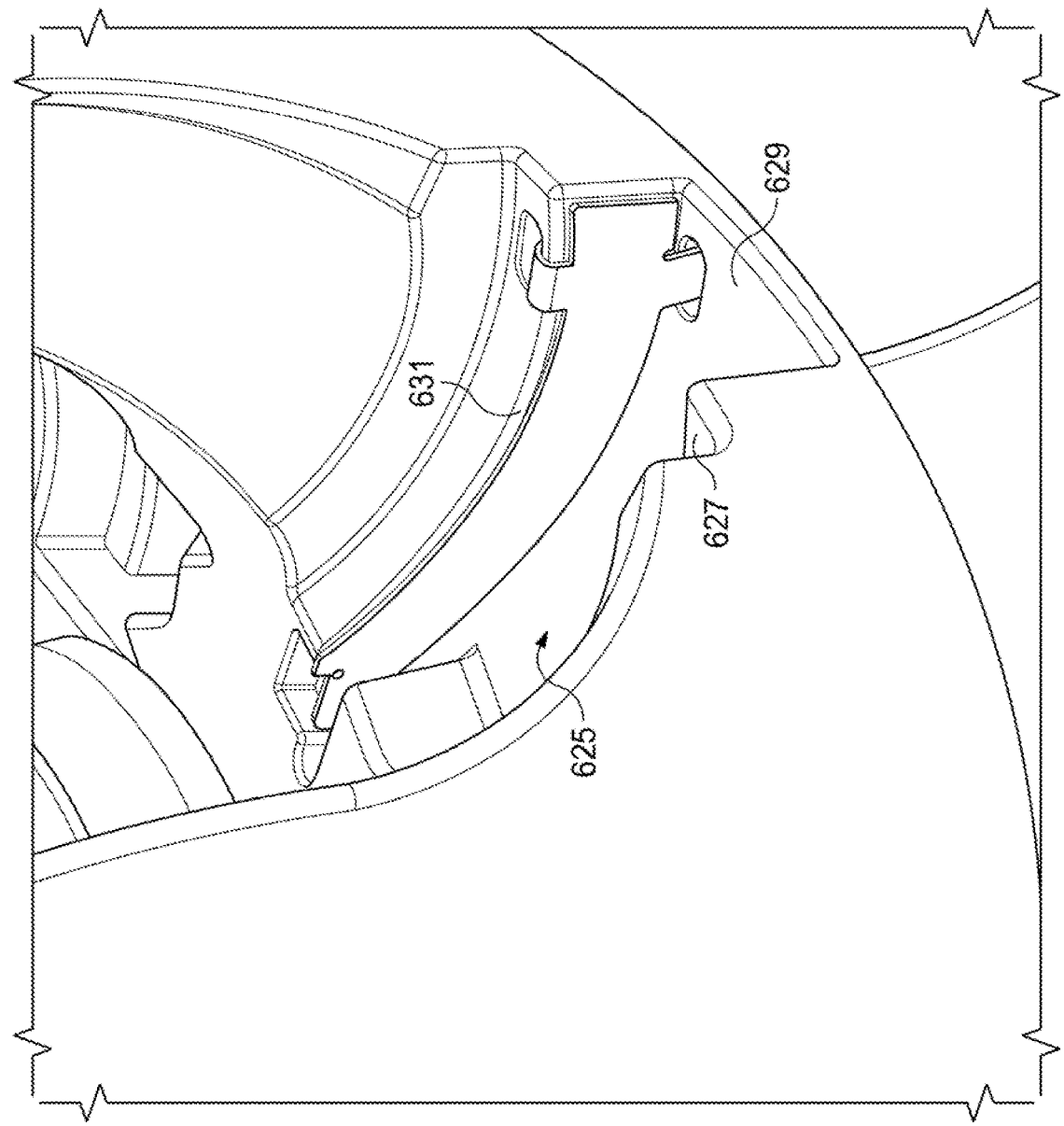

As illustrated in FIG. 6H, in some embodiments, a slot 625 may include one or more adjacent walls 627, 629 and/or 631 adjacent to the slot wall 620 where the slot wall attachment features are positioned. For example, the front pocket 621 may be disposed in adjacent wall 631 and the rear pocket 622 may be disposed in adjacent wall 629. The.

Figure 6I:
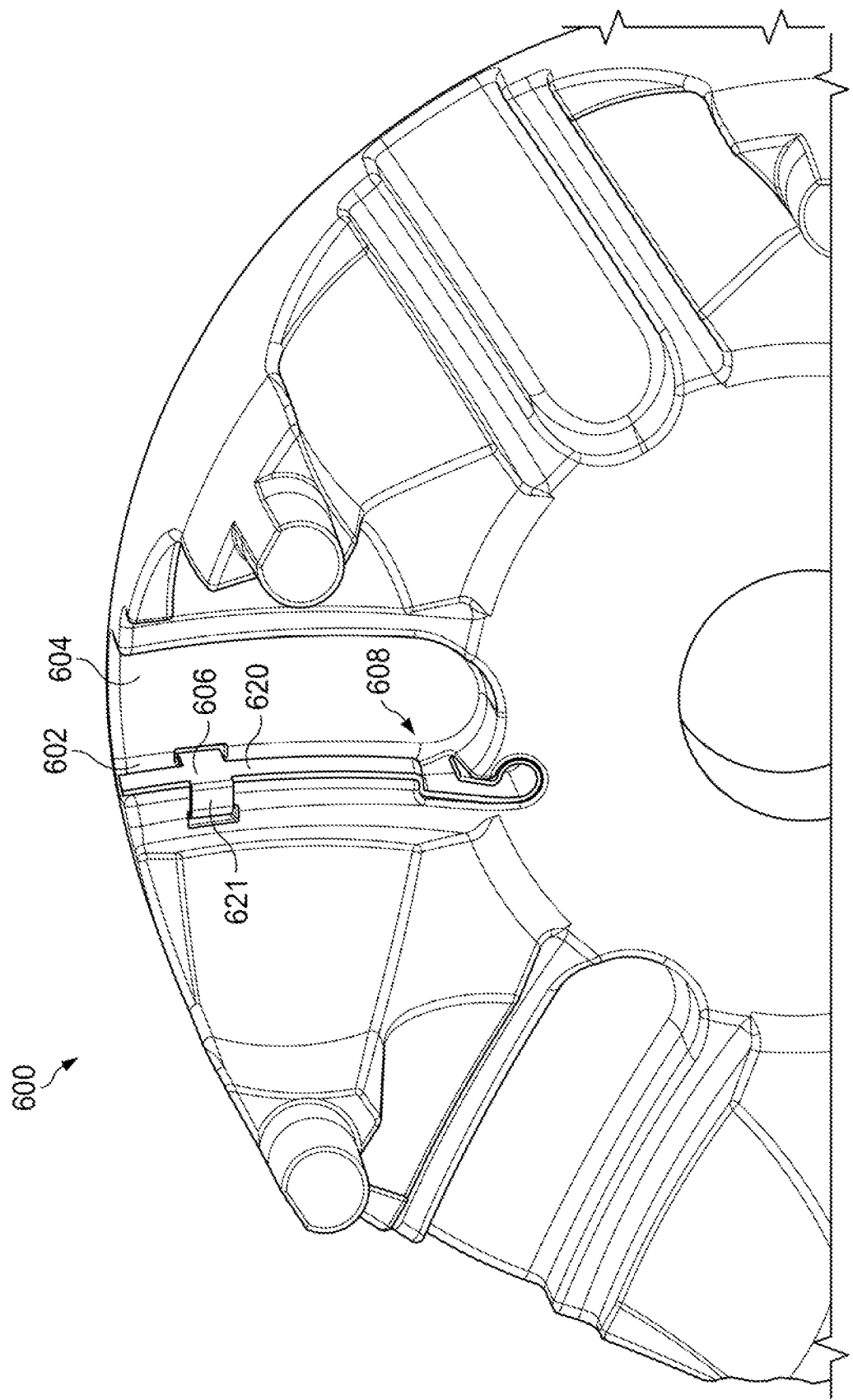

As illustrated in FIG. 6I, in some embodiments, the bottom tab 608 may have a set of shapes (bends, curves, straight segments, etc.) to form a locking mechanism. The shape may be designed to cooperatively fit within a similar shape of the bottom pocket 623. The shape of the bottom tab 608 and bottom pocket 623 may help to retain the bottom of the protective layer 602 in place in all three directions (up, down, left right, forward, and backward). The shape of the bottom tab 608 may be shaped into a spring-loaded form that can be pinched, slid into the bottom pocket 623, and released to bias itself against the walls of the bottom pocket 623.

Figure 6J:
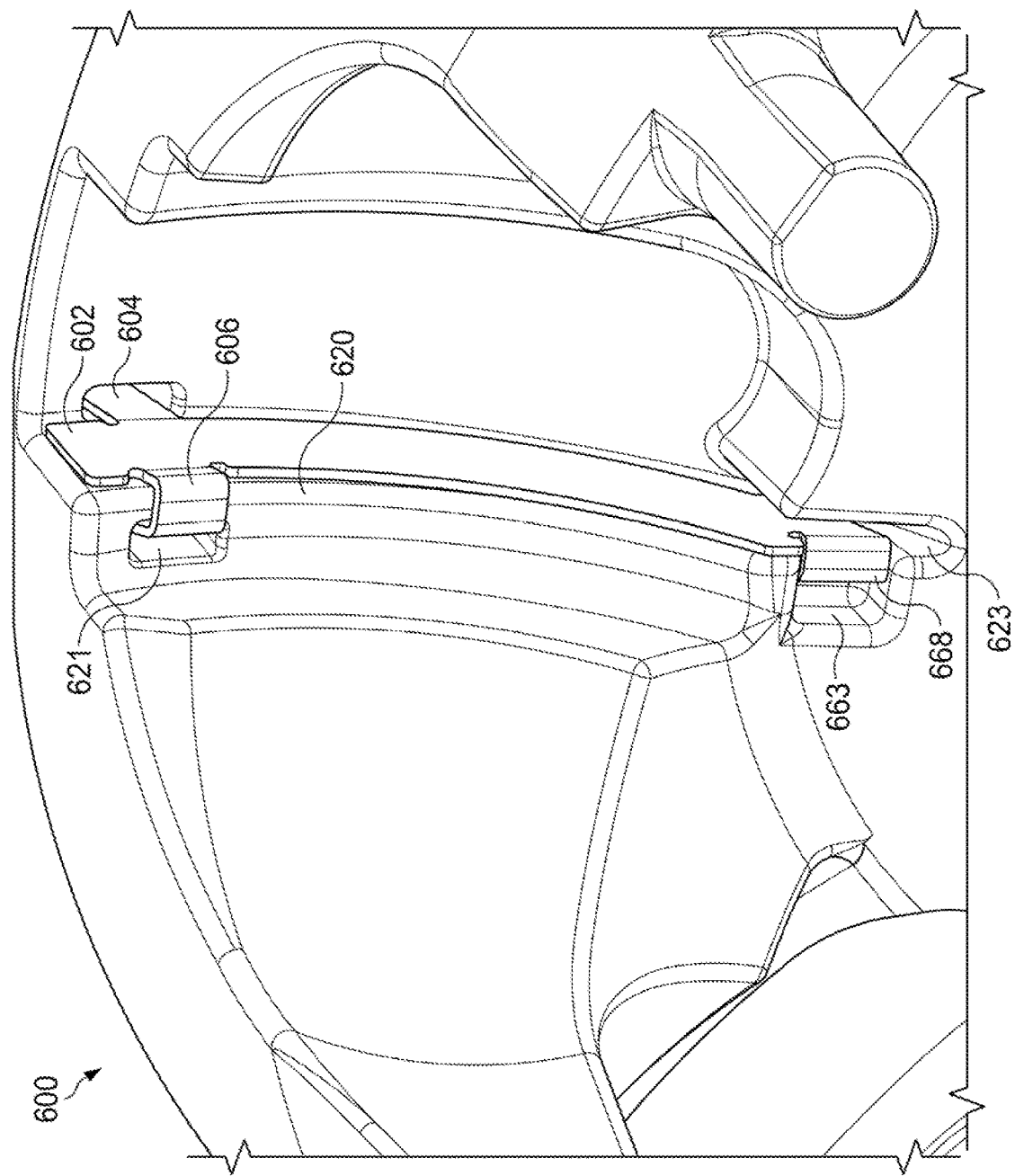

As illustrated in FIG. 6J, in some embodiments, the slot wall 620 may include a second front pocket 663 in addition to the front pocket 621, and the protective layer 602 may include a second front tab 668 configured to fit within the second front pocket 663.

FIGS. 7A-7J illustrate example shapes of different protective layers that can be affixed to a slot wall, such as the slot wall 620. The specific arrangement of tabs on each side of a layer may depend on the particular configuration of the slot wall and its attachment features, including whether one side of a slot wall is more conducive to tab attachment, the rigidity of the attachment, whether bonding agents will be applied, etc. In some examples, any of the tabs may be folded or shaped into a locking mechanism.

Figure 7C:
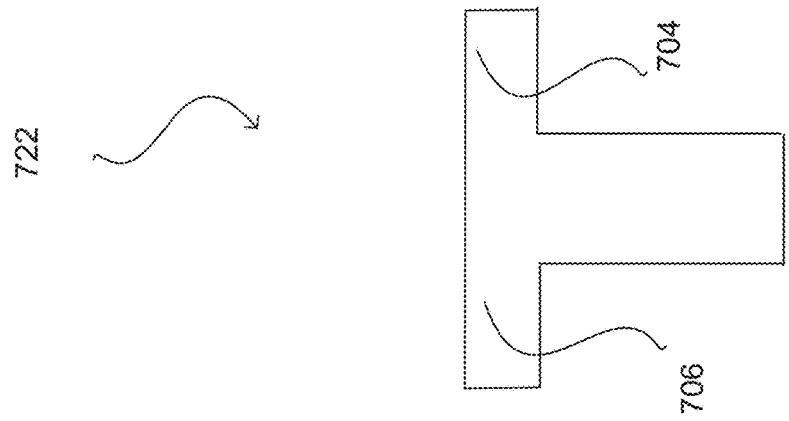
Figure 7B:
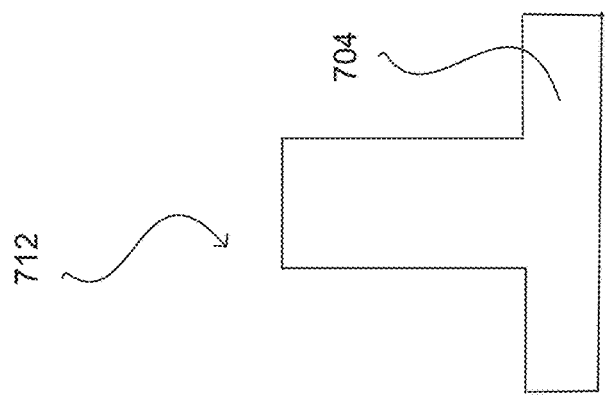
Figure 7A:
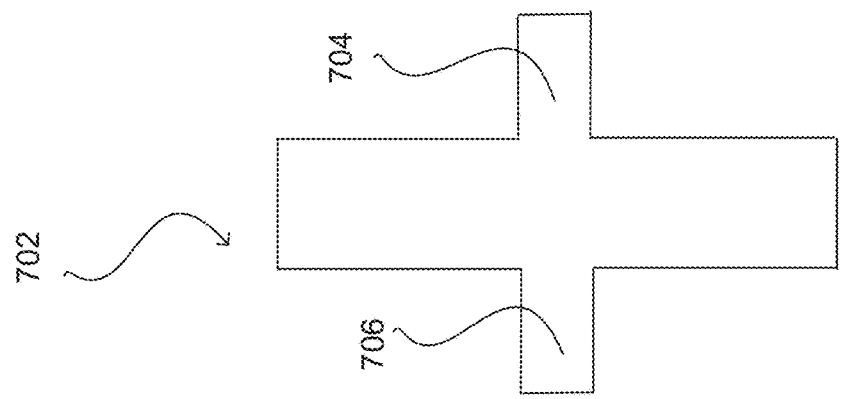

In FIG. 7A, the protective layer 702 may include tabs 704 and 706 on opposing sides. The tabs 704 and 706 may be implemented in a same or similar manner as the tabs 604 and 606. In FIG. 7B, the protective layer 712 may include the tabs 704 and 706 at the bottom of the protective layer 712. In some embodiments, the protective layer 702 may extend only over the upper portion of a slot wall. In FIG. 7C, the protective layer 722 may include the tabs 704 and 706 at the top of the protective layer 722. In some embodiments, the protective layer 722 may cover only a lower portion of a slot wall.

Although not shown, other shapes that cover various portions of a slot wall are contemplated, e.g., covering only a central portion of the slot wall. Such implementations may permit the protective layer 712 or 722 to be localized to one or more regions that most frequently interact with the first cap 119 and/or the second cap 121 and/or one or more regions in which the first cap 119 and/or the second cap 121 exert greatest forces.

In various embodiments, each side of the protective layer may have different number and/or arrangement of tabs.

Figure 7F:
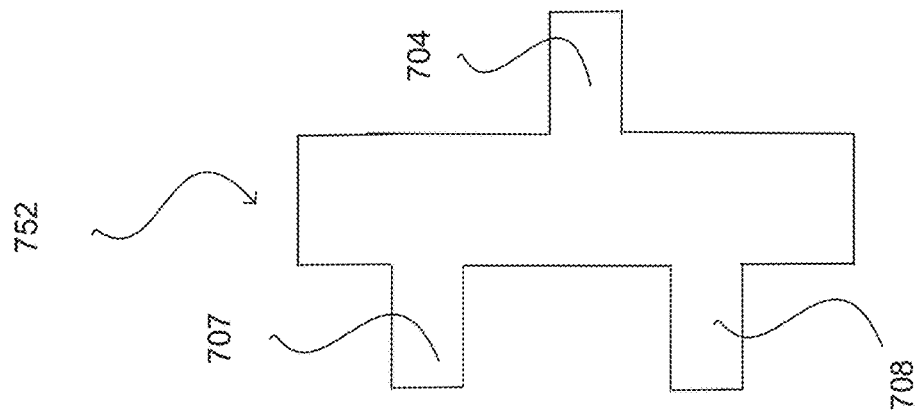
Figure 7E:
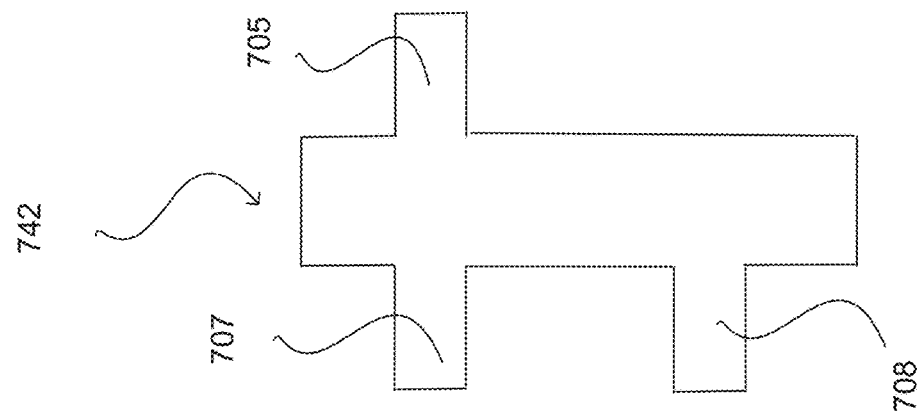
Figure 7D:
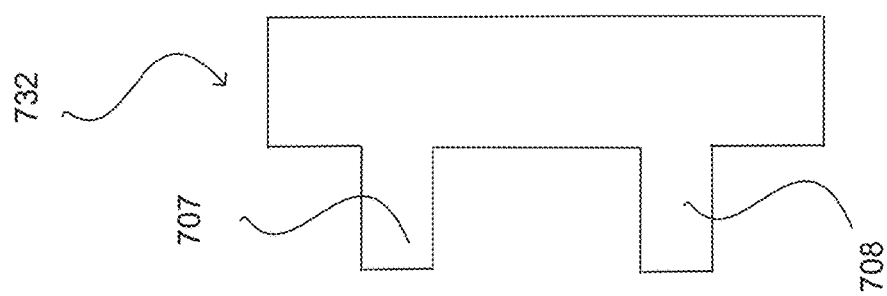
Figure 7I:
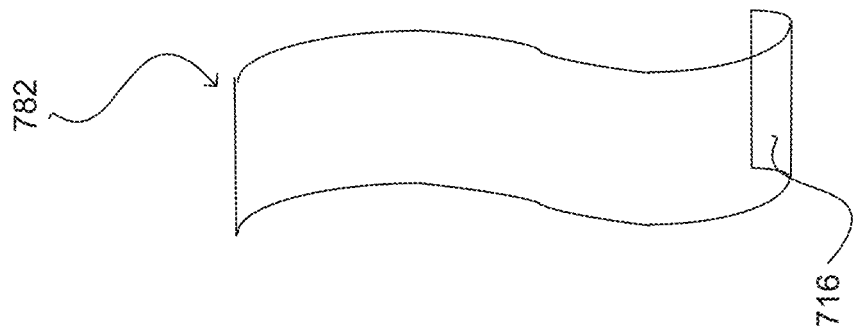

In FIG. 7D, the protective layer 732 may include tabs 707 and 708 on one side and no tabs on the other side. In FIG. 7E, the protective layer 742 may include the tabs 707 and 708 and a single tab 705 on the other side and vertically positioned alongside the tab 707. In FIG. 7F, the protective layer 752 may include the tabs 707 and 708 on one side and the tab 704 on the other side and vertically positioned between the tabs 707 and 708. In FIG. 7G, the protective layer 762 may include a single tab 706 on one side and no tabs on an opposite side.

Figure 7H:
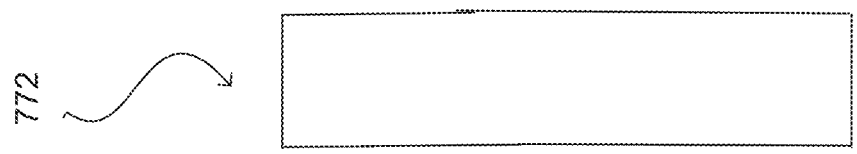
Figure 7G:
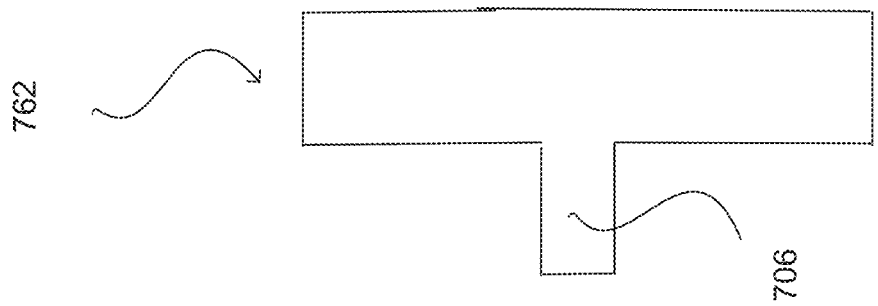

As illustrated in FIG. 7H, the protective layer 772 may be absent of tabs, and instead, may be clipped or bonded to a slot wall.

As illustrated in FIG. 7I, a layer 782 may be curved at a bottom to secure the protective layer 782 to a slot wall attachment feature, such as a pocket, at a bottom of a carrier wall.

As illustrated in FIG. 7J, the protective layer 792 may include bent regions to secure the protective layer 782 to a slot wall attachment feature, such as an open or closed pocket.

Figure 8A:
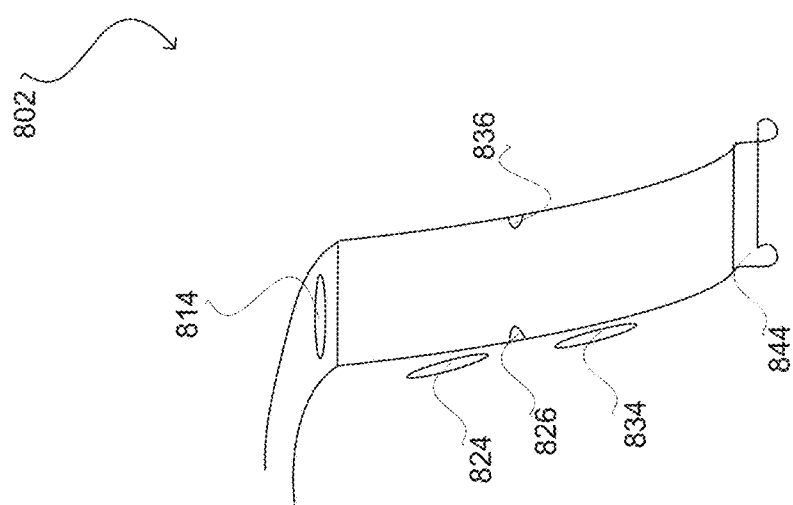

FIG. 8A illustrates a slot wall 802 with slot wall attachment features, in some embodiments. The slot wall 802 may include pockets 814, 824, 834, and 844 and/or clips 826 and 836. The pocket 814 may be positioned at or near the top of the slot wall 802. The pockets 824 and 834 may be positioned at sides of the slot wall 802. The pocket 844 may be positioned at the bottom of the slot wall 802. Any of the pockets 814, 824, 834, and 844 may be open or closed. The clips 826 and 836 may be bent over the protective layer (e.g., protective layer 772) to retain the protective layer thereon. The protective layer (e.g., protective layer 772) may have recesses where the clips 826 and 836 are attached to create a more uniform thickness or so that the end caps do not come into contact with the clips 826 and 836.

FIG. 8B illustrates a slot wall 812 with the slot wall attachment features as shown in FIG. 8A, however, with a pocket 854 different than the pocket 844. The pocket 854 may have an opening narrower at its entrance to form a locking mechanism that prevents the protective layer from being easily removed.

FIGS. 8C, 8D and 8E show an example protective layer 862 with a locking mechanism 884 in different stages of compression. In some embodiments, the locking mechanism 862 may be positioned at the bottom of the protective layer 862 or elsewhere. In some embodiments, the locking mechanism may be initially uncompressed, then compressed and while compressed slid into the narrow opening or laterally into the pocket 854 of FIG. 8B. Then, the locking mechanism 884 may be released, thereby causing its surface to bias against the inside surface of the pocket 854. FIG. 8C shows the locking mechanism 884 in an uncompressed state, e.g., prior to insertion within the pocket 854. FIG. 8D shows the locking mechanism 884 in a compressed state, e.g., so that it can be slid through the narrow entrance or laterally into the pocket 854. FIG. 8E shows the locking mechanism 884 in its released state, e.g., after the insertion into the pocket 854.

The protective layer 862 may also have a top tab 876 configured to affix within the top pocket 814, an upper left tab 866 configured to affix within an upper left pocket 824, and a lower left tab 874 configured to affix within the lower left pocket 834.

The relevant principles shown in or discussed with regard to any of the figures may be applied to other figures. For example, any relevant principles shown in or discussed with regard to FIGS. 6A-6J may be applied to and/or be combined with relevant principles shown in or discussed with regard FIGS. 7A-7J and FIGS. 8A-8E, as appropriate.

The foregoing description of the preferred embodiments of the present invention is by way of example only, and other variations and modifications of the above-described embodiments and methods are possible in light of the foregoing teaching. The term substantially may be construed to mean within a range of, such as within 5 percent of, 10 percent of, 20 percent of, or any other suitable range. The embodiments described herein are not intended to be exhaustive or limiting.

The invention claimed is:

1. A continuous variable planetary (CVP) system, comprising:
 a first carrier positioned about an axis and having a slot, the slot having one or more slot walls;
 a second carrier positioned about the axis, at least one of the first carrier or second carrier being rotatable about the axis relative to the other to cause an angular misalignment of the first carrier relative to the second carrier;
 at least one planetary assembly coupled between the first carrier and the second carrier, each planetary assembly including a planet, a planet axle about which the planet rotates, and an end cap on at least one end of the planet axle, the end cap disposed within the slot, the angular misalignment of the first carrier relative to the second carrier inducing a skew condition on the planet axle, the skew condition thereby inducing a tilt condition on the planet axle as the end cap moves within the slot and the planet axle moves towards a zero skew condition; and
 a protective layer conforming to a contour of at least a portion of at least one of the one or more slot walls to protect the at least one of the one or more slot walls from damage caused by the end cap, the protective layer including one or more protective layer attachment features configured to attach to one or more slot wall attachment features to secure the protective layer within the slot.

2. The CVP system of claim 1, wherein the protective layer is metallic.

3. The CVP system of claim 1, wherein the protective layer is made from a ferrous alloy.

4. The CVP system of claim 1, wherein the protective layer is made from steel.

5. The CVP system of claim 1, wherein the protective layer is made from carbon steel.

6. The CVP system of claim 1, wherein the first carrier is rotatable.

7. The CVP system of claim 1, wherein the second carrier is rotatable.

8. The CVP system of claim 1, wherein the first and second carriers are both rotatable.

9. The CVP system of claim 1, wherein the at least one of the one or more slot walls is flat.

10. The CVP system of claim 1, wherein the at least one of the one or more slot walls is curved.

11. The CVP system of claim 1, wherein the one or more protective layer attachment features comprise one or more tabs, and the one or more slot wall attachment features comprise one or more pockets.

12. The CVP system of claim 11, wherein the one or more tabs include bent portions.

13. The CVP system of claim 11, wherein the one or more tabs includes curved portions.

14. The CVP system of claim 11, wherein the one or more pockets include a pocket at a bottom of the at least one of the one or more slot walls.

15. The CVP system of claim 11, wherein the one or more pockets include an open pocket through to a back side of the first carrier.

16. The CVP system of claim 1, wherein the first carrier and the second carrier comprise magnesium.

17. The CVP system of claim 1, wherein the protective layer comprises a metallic layer with a thickness of between 0.05 mm and 0.3 mm.

18. The CVP system of claim 1, wherein the at least one of the one or more slot walls includes only a rear slot wall.

19. The CVP system of claim 1, wherein the at least one of the one or more slot walls includes only a front slot wall.

20. The CVP system of claim 1, wherein the one or more slot wall attachment features comprises a clip.

21. The CVP system of claim 1, wherein the protective layer is manufactured with pliant materials capable of being conformed to the contour of the at least a portion of the at least one of the one or more slot walls.

22. A continuous variable planetary (CVP) system, comprising:
 a first carrier positioned about an axis and having a plurality of first slots, each first slot having one or more first slot walls, each of the plurality of first slots having a plurality of first slot wall attachment features;
 a second carrier positioned about the axis and having a plurality of second slots, each second slot having one or more second slot walls, each of the plurality of second slots having a plurality of second slot wall attachment features, at least one of the first carrier or the second carrier being rotatable about the axis relative to the other to cause an angular misalignment of the first carrier relative to the second carrier;
 a plurality of planetary assemblies coupled between the first carrier and the second carrier, each planetary assembly including a planet, a planet axle about which the planet rotates, a first end cap on a first end of the planet axle, and a second end cap on a second end of the planet axle, each first end cap disposed within one of the plurality of first slots, each second end cap disposed within one of the plurality of second slots, the angular misalignment of the first carrier relative to the second carrier inducing a skew condition on each planet axle, the skew condition thereby inducing a tilt condition on each planet axle as the end cap moves within the slot and the planet axle moves towards a zero skew condition; and
 a protective layer conforming to a contour of at least a portion of at least one of the one or more first slot walls of each first slot and to a contour of at least a portion of at least one of the one or more second slot walls of each second slot to protect each first slot and each second slot from damage caused by the end cap, the protective layer including one or more protective layer attachment features configured to attach to one or more of the plurality of first slot wall attachment features or one or more of the plurality of second slot wall attachment features to secure the protective layer within the slot.

* * * * *